(12) United States Patent
De Rose et al.

(10) Patent No.: US 8,836,646 B1
(45) Date of Patent: Sep. 16, 2014

(54) METHODS AND APPARATUS FOR SIMULTANEOUS USER INPUTS FOR THREE-DIMENSIONAL ANIMATION

(75) Inventors: Tony De Rose, San Rafael, CA (US); Kenrick Kin, San Jose, CA (US)

(73) Assignee: Pixar, Emeryville, CA (US)

( * ) Notice: Subject to any disclaimer, the term of this patent is extended or adjusted under 35 U.S.C. 154(b) by 834 days.

(21) Appl. No.: 12/429,052

(22) Filed: Apr. 23, 2009

Related U.S. Application Data

(60) Provisional application No. 61/047,735, filed on Apr. 24, 2008.

(51) Int. Cl.
  *G06F 3/041* (2006.01)
  *G06T 15/20* (2011.01)
  *G06F 3/033* (2013.01)

(52) U.S. Cl.
  USPC .............................. 345/173; 345/427; 715/863

(58) Field of Classification Search
  USPC ............................. 345/173, 427; 715/702, 863
  See application file for complete search history.

(56) References Cited

U.S. PATENT DOCUMENTS

| | | | |
|---|---|---|---|
| 5,483,261 A | 1/1996 | Yasutake | |
| 5,559,944 A | 9/1996 | Ono | |
| 5,666,139 A | 9/1997 | Thielens et al. | |
| 5,714,977 A * | 2/1998 | Mc Neil | 345/157 |
| 5,801,704 A | 9/1998 | Oohara et al. | |
| 5,812,118 A | 9/1998 | Shieh | |
| 5,825,352 A * | 10/1998 | Bisset et al. | 345/173 |
| 5,844,547 A | 12/1998 | Minakuchi et al. | |
| 6,016,147 A * | 1/2000 | Gantt | 345/420 |
| 6,067,079 A | 5/2000 | Shieh | |
| 6,094,197 A | 7/2000 | Buxton et al. | |
| 6,130,962 A | 10/2000 | Sakurai | |
| 6,191,773 B1 | 2/2001 | Maruno | |
| 6,334,003 B1 | 12/2001 | Yokota | |
| 6,940,494 B2 | 9/2005 | Hoshino et al. | |
| 6,958,749 B1 | 10/2005 | Matsushita et al. | |
| 7,190,461 B2 | 3/2007 | Han et al. | |
| 7,210,107 B2 | 4/2007 | Wecker et al. | |
| 7,461,356 B2 | 12/2008 | Mitsutake | |
| 7,593,000 B1 | 9/2009 | Chin | |
| 7,598,949 B2 | 10/2009 | Han | |
| 7,812,828 B2 | 10/2010 | Westerman et al. | |

(Continued)

OTHER PUBLICATIONS

Kahn et al. "HoverCam: Interactive 3D Navigation for Proximal Object Inspection,"; *Proceedings of SI3D '05*: pp. 73-80; AMC Press 2005.

(Continued)

*Primary Examiner* — Xiao Wu
*Assistant Examiner* — Yingchun He
(74) *Attorney, Agent, or Firm* — Kilpatrick Townsend & Stockton LLP

(57) ABSTRACT

A method for a computer system includes determining a plurality of positions of portions of a hand of a user simultaneously placed upon a user interface device of the computer system, retrieving a set of display icons in response to the plurality of positions of the portions of the user hand, displaying the display icons from the set of display icons on a display relative to the plurality of positions of the portions of the user hand; while displaying the display icons on the display, determining a user selection of a display icon from the display icons, and performing a function in response to the user selection of the display icon.

32 Claims, 10 Drawing Sheets

(56) References Cited

U.S. PATENT DOCUMENTS

| | | |
|---|---|---|
| 7,855,718 B2 | 12/2010 | Westerman |
| 7,925,996 B2 | 4/2011 | Hofmeister et al. |
| 2003/0048260 A1 | 3/2003 | Matusis |
| 2003/0189567 A1* | 10/2003 | Baumberg ............... 345/419 |
| 2004/0051709 A1* | 3/2004 | Ogawa et al. ............ 345/418 |
| 2005/0068537 A1 | 3/2005 | Han et al. |
| 2005/0159186 A1 | 7/2005 | Cho et al. |
| 2006/0026521 A1* | 2/2006 | Hotelling et al. ........ 715/702 |
| 2006/0026535 A1 | 2/2006 | Hotelling et al. |
| 2006/0086896 A1 | 4/2006 | Han |
| 2007/0152984 A1* | 7/2007 | Ording et al. ............ 345/173 |
| 2007/0182595 A1 | 8/2007 | Ghasabian |
| 2007/0216905 A1 | 9/2007 | Han et al. |
| 2008/0029691 A1 | 2/2008 | Han |
| 2008/0042979 A1 | 2/2008 | Nikbin |
| 2008/0174570 A1 | 7/2008 | Jobs et al. |
| 2008/0179507 A2 | 7/2008 | Han |
| 2008/0180404 A1 | 7/2008 | Han et al. |
| 2008/0180405 A1 | 7/2008 | Han et al. |
| 2008/0180406 A1 | 7/2008 | Han et al. |
| 2008/0284925 A1 | 11/2008 | Han |
| 2009/0033637 A1 | 2/2009 | Han |
| 2009/0044023 A1 | 2/2009 | Crumlin et al. |
| 2009/0143141 A1 | 6/2009 | Wells et al. |
| 2009/0219252 A1 | 9/2009 | Jarventie et al. |
| 2009/0254855 A1 | 10/2009 | Kretz et al. |
| 2009/0256857 A1 | 10/2009 | Han et al. |
| 2009/0259964 A1 | 10/2009 | Davidson et al. |
| 2009/0259965 A1 | 10/2009 | Davidson et al. |
| 2009/0259967 A1 | 10/2009 | Davidson et al. |
| 2010/0020040 A1 | 1/2010 | Han |
| 2010/0053304 A1 | 3/2010 | Underkoffler et al. |

OTHER PUBLICATIONS

Non-Final Office Action mailed on Aug. 17, 2011 for U.S. Appl. No. 12/429,055, 54 pages.
Final Office Action mailed on Jun. 8, 2012 for U.S. Appl. No. 12/429,055, 24 pages.
Non-Final Office Action mailed on Mar. 29, 2013 for U.S. Appl. No. 12/429,055, 16 pages.
Non-Final Office Action mailed on May 16, 2012 for U.S. Appl. No. 12/885,388, 8 pages.
Office Action mailed Mar. 4, 2013 in U.S. Appl. No. 12/885,388, 9 pages.
Final Office Action mailed on Dec. 5, 2013 for U.S. Appl. No. 12/429,055, 16 pages.

* cited by examiner

METHODS AND APPARATUS FOR SIMULTANEOUS USER INPUTS FOR THREE-DIMENSIONAL ANIMATION

CROSS-REFERENCES TO RELATED APPLICATIONS

The present application claims priority to and is a non-provisional application of U.S. Provisional Patent Ser. No. 61/047,735 filed Apr. 24, 2008. This disclosure is hereby incorporated by reference in their entirety for all purposes.

BACKGROUND

Embodiments of the present invention relate to three-dimensional environment user interfaces. More specifically, various embodiments of the present invention relate to user interface devices and methods allowing a user to intuitively navigate within a virtual three-dimensional environment.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and "Clash Of The Titans" (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer animation/computer generated imagery (CGI) industry was Pixar. Pixar is more widely known as Pixar Animation Studios, the producer of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), "Wall-E" (2008) and others. In addition to creating animated features, Pixar developed computing platforms specially designed for animation, and software now known as RenderMan®. RenderMan® has been recognized with multiple Academy Awards® and has been well received in the CGI industry—47 of the last 50 Academy Award Nominees for Visual Effects have used RenderMan®.

The inventors of the present invention have recognized that a problem users encounter when producing animation is how to efficiently and intuitively navigate and manipulate virtual objects in a virtual three-dimensional environment. More particularly, the inventors have recognized that typical user interfaces such as keyboards, mice, and the like often hinder the animation process—users being able to place characters within a scene, specify positions of camera within a scene, move objects within a scene, and the like.

In typical cases, the user may use a keyboard to enter numeric values to specify positions of objects in a scene. The problem with this is that users often do not have an intuitive feel of the correspondence between the numeric values and the object placement. Instead, the user has to view the 3D placement results on a display, modify the numeric values, view the modified 3D placement results on the display, etc. A similar problem is seen with slider-type graphical user interfaces on the display, where the user must move a slider, view the results, etc.

Another problem is that for highly complex rendering and modeling software programs, graphical user interfaces often consume a substantial portion of the computer display with icons, menus, toolbars, and the like. Accordingly, the actual workspace for the user for the three-dimensional environment may be disadvantageously small (e.g. 75% of the display, 50% of the display, or the like).

In other cases, the user may use a mouse, or the like, to navigate in 3D space. The problem with this is that since the cursor typically moves only in 2D space, navigation in the 3D space it is often ambiguous or difficult to visualize. For example, assuming the user is attempting to place an object into an isometric view of a scene, if the cursor is moved upwards, it is ambiguous if the object should be moved vertically upwards, or further back into the scene.

In still other cases, specialized user interface devices including multiple knobs, specialized joysticks including additional degrees of freedom, or the like may be provided. Drawbacks to such devices however, include that operation of such devices are still often non-intuitive and difficult for users to master.

In light of the above, what is needed are efficient and intuitive methods for three-dimensional navigation and object manipulation, without the drawbacks described above.

SUMMARY

Embodiments of the present invention relates to three-dimensional environment user interfaces. More specifically, various embodiments of the present invention relate to a user interface devices and methods allowing a user to intuitively navigate within virtual three-dimensional environments.

Various embodiments of the invention provide a user interface device capable of sensing ore or more user contacts at the same time. In some embodiments, the user interface device may be a region separate from a user display, such as a tablet, mouse surface, or the like. In other embodiments, the user interface device may be placed on top, or integrated with a user display. In such embodiments, as a user places or contacts one or more of their fingers, palms, arms, etc. on the user interface device, the output display portion reflects or acknowledges this contact via changing the display positions at or about the contact positions. As examples, a shape (e.g. a circle halo, square, triangle) may appear under or around each user contact point, an icon may appear next to each user contact point, or the like.

In various embodiments, the one or more contacts of the user interface device allow a user to simply navigate within a three-dimensional environment. In some embodiments, based upon a single contact (e.g. a finger of the user) of the user interface device, as the finger is moved to the left or the right, the virtual camera appears to move clockwise or counter clockwise around the scene; as the finger is moved up or down, the virtual camera appears to be raised or lowered in the scene, while still pointing to the center of the scene; and the like. In various embodiments, combinations of left or right and/or up or down finger movements correspond to combinations of the above the virtual camera movements. Further, in other embodiments, the movements may be mapped to other manipulations of a virtual camera.

In some embodiments, based upon simultaneous contacts (e.g. fingers of the user) on the user interface device at the same time, additional virtual camera parameters may be set or modified. As examples, as the fingers are moved left or right in opposite directions, the virtual camera appears to move towards or away from the scene; as the fingers are moved up or down in opposite directions, the virtual camera appears to roll about an axis (e.g. optical axis); as the fingers are both moved to up or down in the same direction, the virtual camera appears to be raised or lowered in the scene; as the fingers are both moved to the left or the right in the same direction, the virtual camera appears to be shifted to the left or the right in the scene; or the like. In various embodiments, combinations of movements and relative movements correspond to combinations of the above the virtual camera movements. Further, in other embodiments, the movements and relative movements may be mapped to other types of manipulations of the virtual camera.

In various embodiments of the present invention, a user may place their hand upon the user interface device. In response, the user interface device may determine positions where the fingers, the finger tips, the palm, or other portions of the user's hand contacts. The positions typically vary for each user, as users typically have different hand geometries, e.g. finger lengths, finger spacings, hand length, and the like. Based upon the positions of the user's hand, a determination may be made that a menu of functions should be displayed on a display. In response, icons (text/images) representing menu functions are displayed on the display based upon the positions of the user's hand. In various embodiments, the display and the user interface device may be integrated or layered on top. To the user, then, the menu function icons appear on the display near or next to where the finger tips of the user contact the user interface device. If the user moves their hand along the user interface device, the icons may appear to follow the movement of the hand. In other embodiments, the menu function icons appear on the display between where the finger tips of the user contact the user interface device.

In still other embodiments, function icons, or the like may not immediately appear, but appear after a short delay. Such cases would be valuable to a user who has memorized the icons or menus associated with each finger tip, between each finger, or the like. However, if the user is still unsure, the user may maintain the contact until after the delay period, and the function icons or the sub-menus will then be displayed. In various embodiments, the delay period may be pre-defined, user selected, or the like.

In various embodiments, the user may select one of the menu function icons in a variety of ways. For example, in some embodiments, the user may use a finger of their opposite hand to directly contact a menu function icon by contacting the display; the user may lift-off a finger from the user interface device, thereby selecting the menu function icon appearing next to that finger; the user may lift-off other fingers except the finger next to the desired menu function icon; or the like. In various embodiments, the menu function icon may be associated with functions, sub-menus, or the like.

In various embodiments of the present invention, a user may manipulate objects in 3D based upon one or more contacts (e.g. fingers of the user) of the user interface device at the same time. In some embodiments, a user may select an object for manipulation in 3D with a first finger. Based upon the selection, a number of geometric constraints options may become available or visible to the user on the display. As an example, the geometric constraints may constrain movement of the object along a selected geometric axis by selecting a geometric axis with a second finger and moving the first and second fingers along the axis. In various embodiments, to constrain movement or rotation along a geometric axis, the user may select (with a second finger) the geometric axis, and then move the second finger to move or rotate the object. In various embodiments, to constrain movement within a geometric plane, the user may select (with a second and third fingers) the geometric axes defining the geometric plane, and then move the three fingers to move the object within the sensing surface.

In various embodiments, after selecting with the second and/or third fingers, the user may lift-off various fingers. In such embodiments, the order in which a user lifts-off their fingers determines whether geometric constraints are "temporary" or "permanent." For example, if the user lifts-off their first finger, while maintaining a second finger, the object is constrained to move relative to a geometric axis, in response to movement of the second finger ("permanent" constraint); and if the user lifts-off their second finger, while maintaining the first finger, the object remains selected, but the constraint to the geometric axis is not maintained ("temporary" constraint).

In various embodiments of the present invention, a user may place portions of their hands, arms, fingers, etc. on the user input device at the same time. As an example, a user may place a palm but not finger tips on the input device; the user may place the side of their hand shaped in a "I" shape, "O" shape, "C" shape, or the like; the user may place their entire hand on the input device, or the like. In various embodiments, certain geometric combinations or shapes may be associated with specific functions, menus, or the like. As an example, when the user places their palm with or without finger tips on the input device at the same time, the system may recognize this as a request of the user to bring-up a specific menu of functions. As an example, when the finger tips are approximately evenly spaced, a first menu of functions (e.g. file functions: open, save, delete, close, etc.) may be retrieved; when the ring to pointer finger tips are placed adjacent to each other and the thumb and pinky are separate, a second menu of functions (e.g. edit functions: copy, paste, find replace, etc.) may be retrieved; or the like.

According to various aspects of the present invention, a method is described. One technique includes determining a first position of a first indicator of the user placed upon a user interface device of the computer system, determining a first position of a second indicator of the user placed upon a user interface device of the computer system, determining a first set of virtual camera parameters for a virtual camera in three-dimensional space relative to a three-dimensional scene, and determining a first image of a three-dimensional scene in response to the first set of virtual camera parameters in three-dimensional space. A process may include displaying the first image of the three-dimensional scene to a user on a display of the computer system, determining a second position of the first indicator of the user placed upon the user interface device of the computer system, determining a second position of the second indicator of the user placed upon the user interface device of the computer system, and determining a second set of virtual camera parameters for the virtual camera in three-dimensional space relative to the three-dimensional scene in response to the first set of virtual camera parameters, to the first position and the second positions of the first indicator of the user, and to the first position and the second position of the second indicator. An operation may include determining a second image of a three-dimensional scene in response to the second set of virtual camera parameters in three-dimensional space, and displaying the second image of the three-dimensional scene to the user on the display of the computer system.

According to various aspects of the present invention, a computer program product comprising a tangible medium including computer system executable code for a computer system including a processor, a memory and a display. In various embodiments, the computer program product includes code that directs a processor to determine a first position of a first indicator of the user placed upon a user interface device of the computer system, code that directs a processor to determine a first position of a second indicator of the user placed upon a user interface device of the computer system, code that directs a processor to determine a first set of virtual camera parameters for a virtual camera in three-dimensional space relative to a three-dimensional scene, and code that directs a processor to determine a first image of a three-dimensional scene in response to the first set of virtual camera parameters in three-dimensional space. The tangible media may include code that directs a processor to display the first image of the three-dimensional scene to a user on a display of the computer system, code that directs a processor to determine a second position of the first indicator of the user placed upon the user interface device of the computer system, code that directs a processor to determine a second position of the second indicator of the user placed upon the user interface device of the computer system, and code that directs a processor to determine a second set of virtual camera parameters for the virtual camera in three-dimensional space relative to the three-dimensional scene in response to the first set of virtual camera parameters, to the first position and the second positions of the first indicator of the user, and to the first position and the second position of the second indicator. A computer program product may include code that directs a processor to determining a second image of a three-dimensional scene in response to the second set of virtual camera parameters in three-dimensional space, and code that directs a processor to display the second image of the three-dimensional scene to the user on the display of the computer system. The tangible media may include optical storage media, magnetic storage media, semiconductor storage media, electrical storage media, or the like.

According to various aspects of the present invention, a computer system is described. One device includes a memory configured to store a first set of virtual camera parameters for a virtual camera in three-dimensional space relative to a three-dimensional scene. An apparatus may include a processor coupled to the memory, wherein the processor is configured to determine a first image of a three-dimensional scene in response to the first set of virtual camera parameters in three-dimensional space, configured to determine a second position of the first indicator of the user placed upon the user interface device of the computer system, configure to determine a second position of the second indicator of the user placed upon the user interface device of the computer system, configured to determine a second set of virtual camera parameters for the virtual camera in three-dimensional space relative to the three-dimensional scene in response to the first set of virtual camera parameters, to the first position and the second positions of the first indicator of the user, and to the first position and the second position of the second indicator, and configured to determining a second image of a three-dimensional scene in response to the second set of virtual camera parameters in three-dimensional space. A system may include a display coupled to the processor, wherein the display is configured to display the first image of the three-dimensional scene to a user on a display of the computer system, and configured to display the second image of the three-dimensional scene to the user on the display of the computer system.

According to various aspects of the present invention, a method is described. One technique includes displaying a representation of a first three-dimensional object located at a first three-dimensional location at a first display position on a display to a user, determining a first user interface position of a first indicator of the user placed upon a user interface device of the computer system, and determining a selection of the first three-dimensional object in response to the first user interface position and the first display position. A process includes displaying a representation of a plurality of geometric constraints associated with the first three-dimensional object at a plurality of display positions on the display to the user, while the first indicator of the user is placed upon the user interface device, determining a second user interface position of a second indicator of the user placed upon the user interface device, and determining a selection of a geometric constraint from the plurality of geometric constraints in response to the second user interface position and the plurality of display positions. Operations may include determining movement of the second indicator of the user placed upon the user interface device from the second user interface position to a third user interface position, moving the first three-dimensional object from the first three-dimensional location to a second three-dimensional location, in response to the movement of the second indicator and in response to a geometric constraint associated with the selection of the geometric constraint, determining a representation of a first three-dimensional object located at the second three-dimensional location, and displaying the representation of the first three-dimensional object located at the second three-dimensional location at a second display position on the display to the user.

According to various aspects of the present invention, a computer program product comprising a tangible medium including computer system executable code for a computer system including a processor, a memory and a display. In various embodiments, the computer program product includes code that directs a processor to display a representation of the first three-dimensional object located at a first three-dimensional location at a first display position on a display to a user, code that directs a processor to determine a first user interface position of a first indicator of the user placed upon a user interface device of the computer system, and code that directs a processor to determine a selection of the first three-dimensional object in response to the first user interface position and the first display position. The tangible medium may include code that directs a processor to display a representation of a plurality of geometric constraints associated with the first three-dimensional object at a plurality of display positions on the display to the user, code that directs a processor to determine a second user interface position of a second indicator of the user placed upon the user interface device, while the first indicator of the user is placed upon the user interface device, and code that directs a processor to determine a selection of a geometric constraint from the plurality of geometric constraints in response to the second user interface position and the plurality of display positions. The code may include code that directs a processor to determine movement of the second indicator of the user placed upon the user interface device from the second user interface position to a third user interface position, code that directs a processor to move the first three-dimensional object from the first three-dimensional location to a second three-dimensional location, in response to the movement of the second indicator and in response to a geometric constraint associated with the selection of the geometric constraint, code that directs a processor to determine a representation of a first three-dimensional object located at the second three-dimensional location, and code that directs a processor to display the representation of the first three-dimensional object located at the second three-dimensional location at a second display position on the display to the user. The tangible media may include optical storage media, magnetic storage media, semiconductor storage media, electrical storage media, or the like.

According to various aspects of the present invention, a computer system is described. One device includes a memory configure to store a model of a first three-dimensional object. An apparatus may include a processor coupled to the memory, wherein the processor is configured to determine a representation of the first three-dimensional object located at a first three-dimensional location in response to the model, configured to determine a first user interface position of a first indicator of the user placed upon a user interface device of the computer system, configured to determine a selection of the first three-dimensional object in response to the first user interface position, configured to determine a second user interface position of a second indicator of the user placed upon the user interface device, while the first indicator of the user is placed upon the user interface device, configured to determine a selection of a geometric constraint from the plurality of geometric constraints in response to the second user interface position, configured to determine movement of the second indicator of the user placed upon the user interface device from the second user interface position to a third user interface position, configured to move the first three-dimensional object from the first three-dimensional location to a second three-dimensional location, in response to the movement of the second indicator and in response to a geometric constraint associated with the selection of the geometric constraint, and configured to determine a representation of a first three-dimensional object located at the second three-dimensional location. A system may include a display coupled to the processor, wherein the display is configured to display the representation of the first three-dimensional object located at the second three-dimensional location at the second display position on the display to the user, configured to display the representation of the first three-dimensional object located at the first three-dimensional location at a first display position on a display to a user, and configured to display a representation of a plurality of geometric constraints associated with the first three-dimensional object at a plurality of display positions on the display to the user.

According to various aspects of the present invention, a method is described. One technique includes determining a representation of a first three-dimensional object located at a first three-dimensional location, displaying the representation of the first three-dimensional object located at the first three-dimensional location at a first display position on a display to a user, and determining a first user interface position of a first indicator of the user placed upon a user interface device of the computer system. A process includes determining a selection of the first three-dimensional object in response to the first user interface position and the first display position, displaying a representation of a plurality of geometric constraints associated with the first three-dimensional object at a plurality of display positions on the display to the user, and determining a second user interface position of a second indicator of the user placed upon the user interface device. Operations may include moving the first three-dimensional object from the first three-dimensional location to a second three-dimensional location, in response to the second user interface position, wherein the first three-dimensional object moves over a third three-dimensional location that is not associated with a location associated with the first three-dimensional location and the second three-dimensional location, determining a representation of a first three-dimensional object located at the second three-dimensional location, and displaying the representation of the first three-dimensional object located at the second three-dimensional location at a second display position on the display to the user.

According to various aspects of the present invention, a computer program product comprising a tangible medium including computer system executable code for a computer system including a processor, a memory and a display. In various embodiments, the computer program product includes code that directs a processor to determine a representation of a first three-dimensional object located at a first three-dimensional location, code that directs a processor to display the representation of the first three-dimensional object located at the first three-dimensional location at a first display position on the display to a user, and code that directs a processor to determine a first user interface position of a first indicator of the user placed upon a user interface device of the computer system. The tangible medium may include code that directs a processor to determine a selection of the first three-dimensional object in response to the first user interface position and the first display position, code that directs a processor to display a representation of a plurality of geometric constraints associated with the first three-dimensional object at a plurality of display positions on the display to the user, and code that directs a processor to determine a second user interface position of a second indicator of the user placed upon the user interface device after the first indicator of the user is no longer placed upon the user interface device. The executable code may include code that directs a processor to move the first three-dimensional object from the first three-dimensional location to a second three-dimensional location, in response to the second user interface position, wherein the first three-dimensional object moves over a third three-dimensional location that is not associated with a location associated with the first three-dimensional location and the second three-dimensional location, code that directs a processor to determine a representation of a first three-dimensional object located at the second three-dimensional location, and code that directs a processor to display the representation of the first three-dimensional object located at the second three-dimensional location at a second display position on the display to the user. The tangible media may include optical storage media, magnetic storage media, semiconductor storage media, electrical storage media, or the like.

According to various aspects of the present invention, a computer system is described. One device includes a memory configured to store a model of a first three-dimensional object. An apparatus may include a processor coupled to the memory, wherein the processor is configured to determine a representation of the first three-dimensional object located at a first three-dimensional location in response to the model, configured to display the representation of the first three-dimensional object located at the first three-dimensional location at a first display position on the display to a user, configured to determine a first user interface position of a first indicator of the user placed upon a user interface device of the computer system, configured to determine a selection of the first three-dimensional object in response to the first user interface position and the first display position, configured to display a representation of a plurality of geometric constraints associated with the first three-dimensional object at a plurality of display positions on the display to the user, configured to determine a second user interface position of a second indicator of the user placed upon the user interface device after the first indicator of the user is no longer placed upon the user interface device, configured to move the first three-dimensional object from the first three-dimensional location to a second three-dimensional location, in response to the second user interface position, wherein the first three-dimensional object moves over a third three-dimensional location that is not associated with a location associated with the first three-dimensional location and the second three-dimensional location, configured to determine a representation of a first three-dimensional object located at the second three-dimensional location, and configured to display the representation of the first three-dimensional object located at the second three-dimensional location at a second display position on the display to the user.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF EXEMPLARY EMBODIMENTS

Figure 1A:
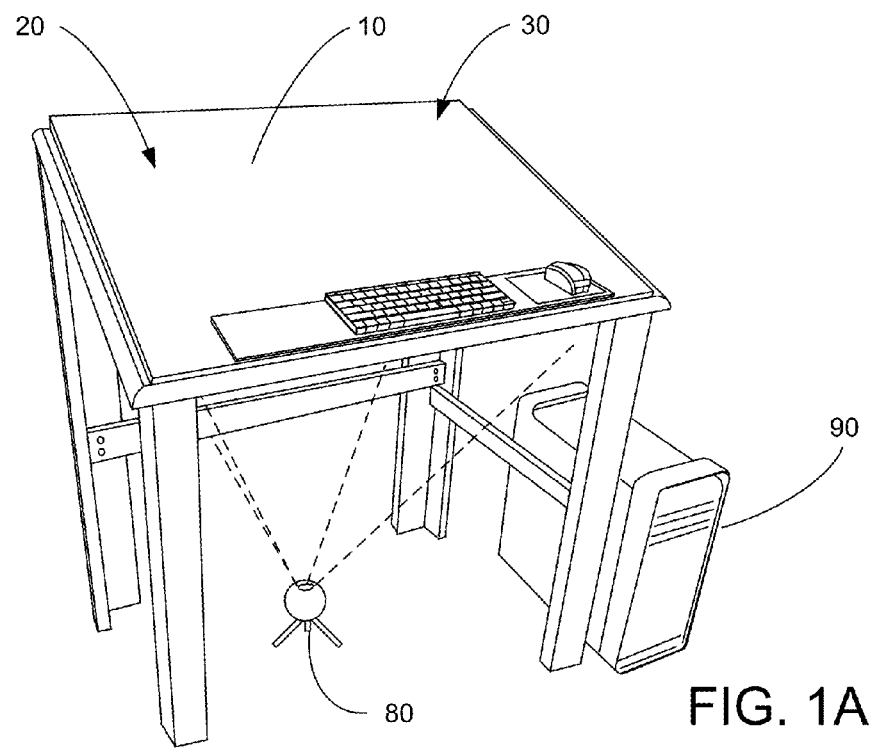
FIGS. 1A-B illustrate a block diagram of a rendering system according to various embodiments of the present invention.
Figure 1B:
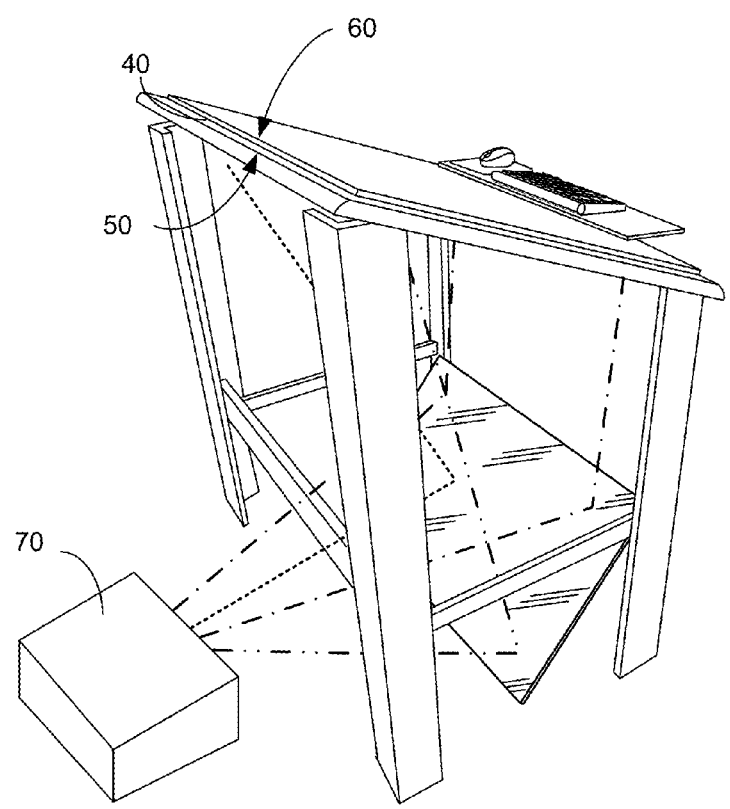

FIGS. 1A-B illustrate a block diagram of a rendering system according to various embodiments of the present invention. More specifically, FIG. 1A illustrates, a computer system display 10 including a display surface 20 that is substantially coincident with a user input surface (sensing surface) 30.

In various embodiments, a (typically) diffuse layer of material 40 includes a bottom surface 50 upon which a computer-generated image is projected or displayed thereon, and a top surface 60 upon which the user contacts, FIG. 1B. In such a configuration, computer system display 10 (diffuse layer) may be said to include both display surface 20 and sensing (user input) surface 30. In other embodiments, display surface 50 may be considered as separate from user sensing surface or device.

In some embodiments of the present invention, computer system display 10 may be based upon a projected image using a computer projector 70, such as a DLP projector, an LCD projector, or the like. In other embodiments, other types of projection displays may also be used. Additionally, in other embodiments, the computer projector may be projected onto top surface 60 of the diffuse layer 40 instead of onto bottom surface 50. In other embodiments of the present invention, computer system display 10 may be based upon more conventional computer system display technology including plasma, LCD, OLED, laser, CRT technology, or the like. Accordingly, the embodiments illustrated in FIGS. 1A-B should not be construed to be limiting.

In various embodiments, user input device (sensing surface) 30 of computer display 10 may serve as a user input device. User input device senses the location of where a user "contacts" one or more locations on sensing surface 30 with one or more portions of their body. In various embodiments, for "contacting" the user must physically contact sensing surface 30 before computer system 90 senses the user. In other embodiments, the user may simply come close to sensing surface 30, but not necessarily make physical contact to sensing surface 30 before computer system 90 registers the user as making "contact."

In various embodiments, as illustrated in FIGS. 1A-B, sensing portion 30 of computer system display 10 may be based upon internal reflection of infrared light. In such embodiments, computer system display 10 includes a number of infrared light sources (not shown) arranged around the perimeter of computer system display 10, and a camera 80, sensitive to infrared light, is pointed at computer system display 10. When the user places one or more fingers, or the like, upon top surface 60, the contact causes a break in the internal reflection of the infrared light in material 40. As a result, camera 80 visibly detects where upon top surface 60 the user is contacting. In other embodiments, sensing portion 30 of computer system display 10 may be based upon resistive wire technology, surface capacitance technology, direct infrared technology (e.g. breaking an infrared light beam), other types of camera devices, or the like. Additional details may be found in Han, J. Y. (2005). Multi-touch sensing through frustrated total internal reflection. In *SIGGRAPH '05: ACM SIGGRAPH 2005 Sketches*, New York, N.Y., USA. ACM Press, incorporated herein for all purposes.

In various embodiments of the present invention, computer system 90 simultaneously determines locations on sensing surface 30 where the user is contacting. In various examples, computer system 90 may simultaneously determine locations where a user places all ten fingers, where a user places their palms, the orientation of the contacting locations, and/or combinations thereof. Additionally, in various embodiments, computer system 90 may track these contacting locations with respect to time, direction, pressure, or the like. In various embodiments, computer system 90 my determine a user's direction and path of movement for contacted locations, computer system 90 may determine the sequence of tap-down contacts to sensing surface 30, computer system 90 may determine the sequence of lift-offs from sensing surface 30, and the like. In various embodiments, computer system 90 may use such information to determine what functions or operations the user wishes to execute.

In still other embodiments, the computer system may recognize shapes of user contacts on sensing surface 30. For example, the computer system may determine that the user is making a "c" shape with their hands, an "o" shape, making a curved-shape, making a straight-shape, or the like. In various embodiments, these recognized shapes may be associated with any number of functions or commands, such as a displacement commands, virtual camera functions, menus or tools commands, or the like, as described below.

In various embodiments, an additional sensor or camera, not illustrated, may be positioned above sensing surface 30 or below sensing surface. In various embodiments, the additional camera may be used to determine the proximity of a hand of the user to sensing surface 30 while not necessarily contacting sensing surface 30. For example, such an additional sensor or camera may be used to capture one or more images of the user's hand or hands in the proximity of sensing surface 30. In various embodiments, the additional camera may be positioned such that the user's hands are between the additional camera and sensing surface 30. In other embodiments, the additional camera or sensing device may be below sensing surface 30 and capture images of the user's hand (e.g. thermal imaging camera).

The captured images of the additional camera or sensing device may be processed such that computer system 90 recognizes if the hand is the user's right hand or left hand; the orientation or direction that the fingers are pointed; an identification of fingers on the user's hand (e.g. ring finger, thumb, etc.); or the like. As will be described below, various embodiments of the present invention use the identification of a particular feature of the hand (e.g. a specific finger) in combination with a contacted position on sensing surface 30, to perform specific functions. In various embodiments, different contacting fingers and different contacting positions may provide different functional results.

In various embodiments, computer system 90 correlates the user contacts on sensing surface 30 with what is being displayed on display surface 20. Accordingly, the user contacts may serve as one or more pointers or inputs to computer system 90 and display surface 20 displays options that the user may select.

In various embodiments, the resolution of sensing surface 30 need not be as high as the display resolution of the images displayed on display surface 20. As an example, the resolution of image sensor 80 may be 640×480, 800×600, 1280×1024, or the like, whereas the display resolution of projector 70, for example, may be 1280×1024, 1280×720, 1600×1200, 1920×1080, or the like. In other embodiments, the resolution of sensing surface 30 may be similar to the display resolution.

Figure 2A:
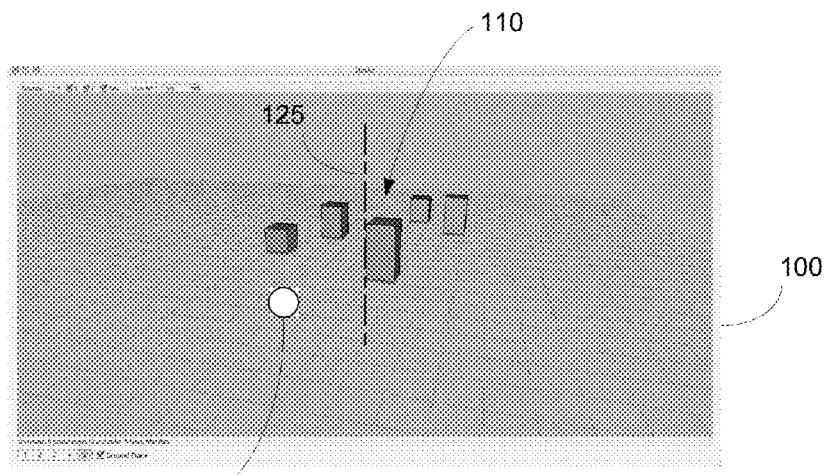
FIGS. 2A-D illustrate an example of an embodiment of the present invention.

FIGS. 2A-D illustrate examples according to various embodiments of the present invention. In various embodiments, within a three-dimensional animation environment, the positioning of a virtual camera may be controlled by the user. More specifically, FIG. 2A illustrates an image 100 as captured from the view point of a virtual camera viewing a three-dimensional scene 140. As can be seen, a number of virtual objects 110 are illustrated within this animation environment.

As illustrated in FIG. 2A, an indicator 120 is displayed on image 100. In various embodiments, indicator 120 provides visual feedback as to where the user is contacting on sensing surface 30, as it correlates to image 100. In other embodiments, other shapes may be used to visually indicate the correlated location, such as a triangle, a halo, an "X", a number, a letter, or the like. In other embodiments, visual feedback may not be provided to the user. In such cases, it may be assumed that the user is aware of where they are contacting, thus no further visual indication may be necessary. In some cases an audio, vibration, or other sensory output may be used in conjunction with visual feedback or in various combinations thereof, or may be used instead of visual feedback.

Figure 2B:
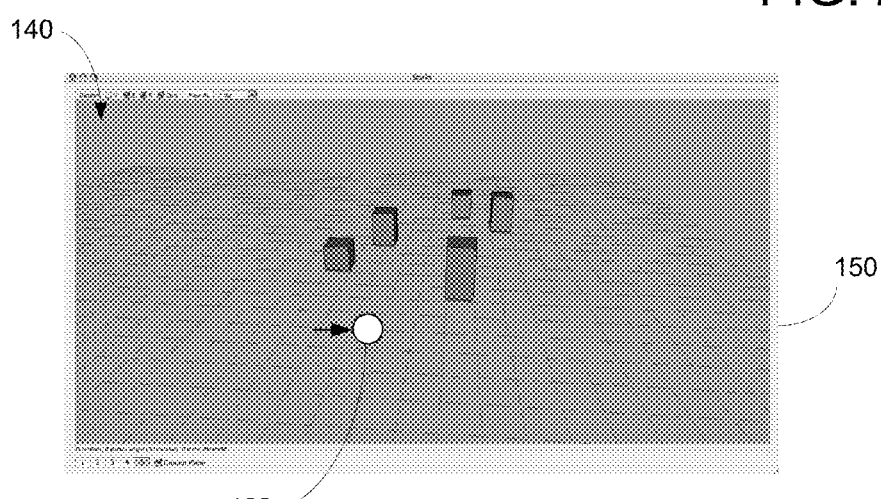

In the example in FIG. 2B, the user moved their hand to the right to indicator 130 on sensing surface 30, while maintaining contact with sensing surface 30. In other embodiments, the user need not maintain constant contact, but simply reach a threshold of contact in order for computer system 90 to conclude that constant contact was intended by the user. For example when moving from indicator 120 to indicator 130, if the user's finger maintains contact for over a threshold (e.g. 75%, 80%, 90%, or the like), computer system 90 may conclude that the motion was intended to be continuous.

In various embodiments of the present invention, in response to the movement of the user's finger, computer system 90 moves the position of the virtual camera with respect to scene 140. More specifically, in various embodiments, a vertical axis of rotation 125 is defined for scene 140, and in response to the user's movement, the virtual camera is moved with regards to the axis of rotation. In the specific example in FIG. 2B, as the user moves their finger to the right, the virtual camera is rotated about the axis of rotation, counter-clockwise, and as the user moves their finger to the left, the virtual camera is rotated, clockwise, or vice-versa. Scene 140 is then re-rendered as image 150, and displayed to the user.

Figure 2C:
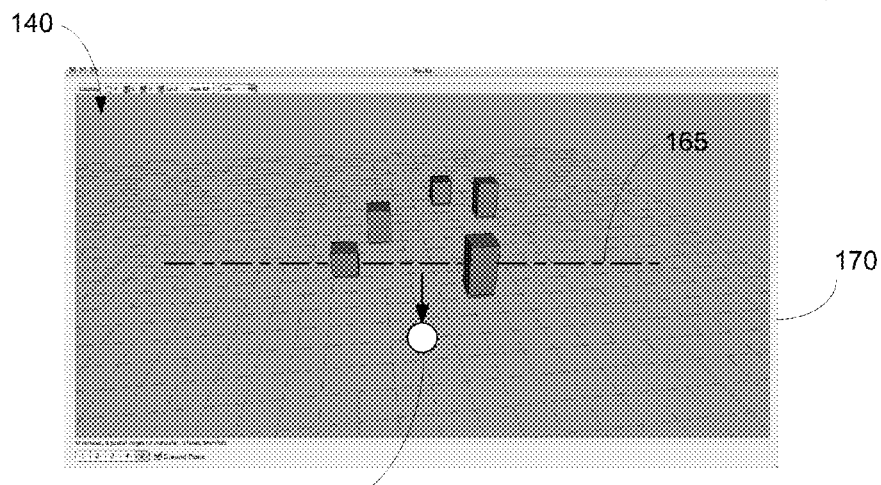

In the example in FIG. 2C, the user has moved their hand to downwards to indicator 160 on sensing surface 30, while maintaining contact with sensing surface 30. Similar to the above, the user need not maintain constant contact, but simply reach a threshold of contact in order for computer system 90 to conclude that constant contact was intended by the user.

In various embodiments of the present invention, in response to this movement of the user's finger, computer system 90 moves the position of the virtual camera with respect to scene 140. More specifically, in various embodiments, a horizontal axis of rotation 165 is defined perpendicular to the virtual camera for scene 140. In response to the user's movement, the virtual camera is moved or elevated with regards to the horizontal axis of rotation. In the specific example in FIG. 2C, as the user moves their finger downwards, the virtual camera is moved upwards in scene 140 about the axis of rotation, and as the user moves their finger upwards, the virtual camera is moved downwards in scene 140 about the axis of rotation, or vice-versa. At the new location for the virtual camera, scene 140 is then re-rendered as image 170, and displayed to the user.

Figure 2D:
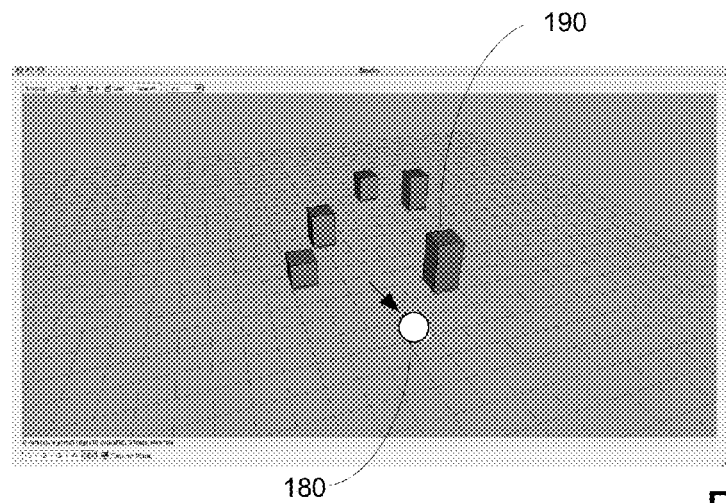

As illustrated in FIG. 2D, the virtual camera may be moved about both a vertical axis of rotation and a horizontal axis of rotation, based upon the movement of the user's finger. As can be seen in FIG. 2D, the user has moved their finger from indicator 120, diagonally to indicator 180. In response, the virtual camera is moved counter-clockwise within scene 140 and the virtual camera is moved upwards.

In other embodiments of the present invention, the axis of rotation may also be defined by the user. For example, the user may select an object from scene 140, such as object 190, as an object in interest. By doing so, the vertical and horizontal axes of rotation may be within or near object 190. Then, as the user moves their finger about sensing surface 30, the virtual camera roughly maintains object 190 within its center region.

Figure 3A:
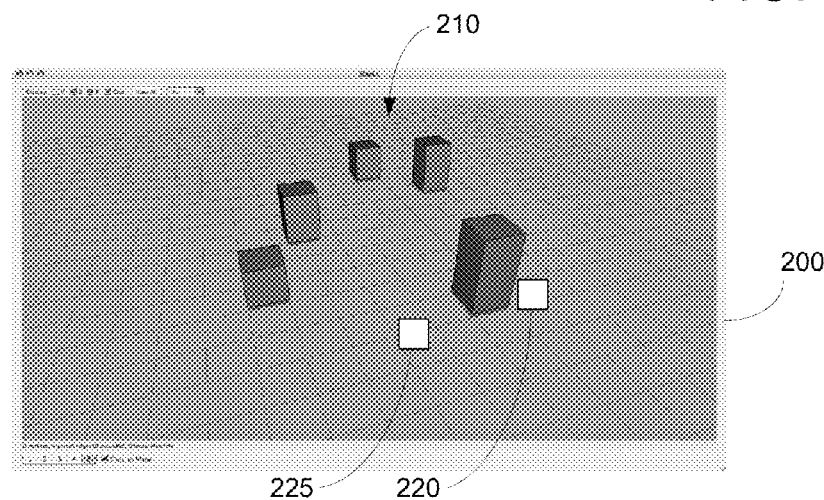
FIGS. 3A-D illustrate examples according to embodiments of the present invention.

FIGS. 3A-D illustrates examples according to various embodiments of the present invention. In various embodiments, within a three-dimensional animation environment, further positioning of a virtual camera may be controlled by the user. More specifically, FIG. 3A illustrates an image 200 as captured from the view point of a virtual camera viewing a three-dimensional scene 240. As can be seen, a number of virtual objects 210 are illustrated within this animation environment.

As illustrated in FIG. 3A, indicators 220 and 225 are is displayed on image 200. In various embodiments, indicators 220 and 225 (or other shapes) again provide visual feedback as to where the user is contacting on sensing surface 30, as it correlates to image 200. In various examples, indicators 220 and 225 may indicate where two fingers of one hand of the user are contacting sensing surface 30, where one finger of each hand of the user are contacting sensing surface 30, or the like.

Figure 3B:
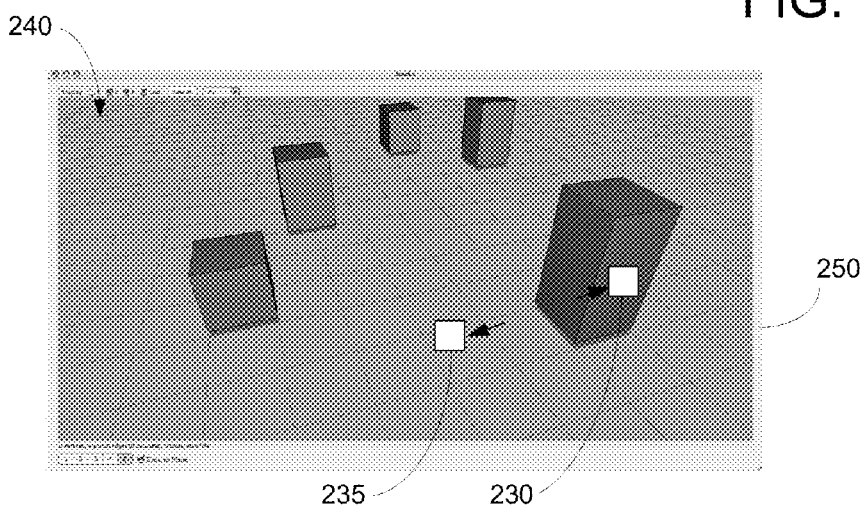

In the example in FIG. 3B, the user has maintained the contacts of the fingers, and has moved the fingers apart. Accordingly, indicator 220 has moved to indicator 230, and indicator 225 has moved to indicator 235. As above, the user need not maintain constant contact in order for computer system 90 to conclude that constant contact was intended by the user.

In various embodiments of the present invention, in response to the movement of the user's fingers, computer system 90 moves the position of the virtual camera with respect to scene 240. More specifically, in various embodiments, the position of the virtual camera is moved "towards" scene 240. In various embodiments, the virtual camera may move forwards along an optical axis of the virtual camera, and the tilt and/or pan of the virtual camera are not changed. In other embodiments, similar to the examples in FIGS. 2A-D, a horizontal axis of rotation perpendicular to the virtual camera, or an object in interest may be defined. In such examples, as the placement of the virtual camera moves towards scene 240, tilt and pan parameters of the virtual camera may also be modified. Scene 240 is then re-rendered as image 250, and displayed to the user.

Figure 3C:
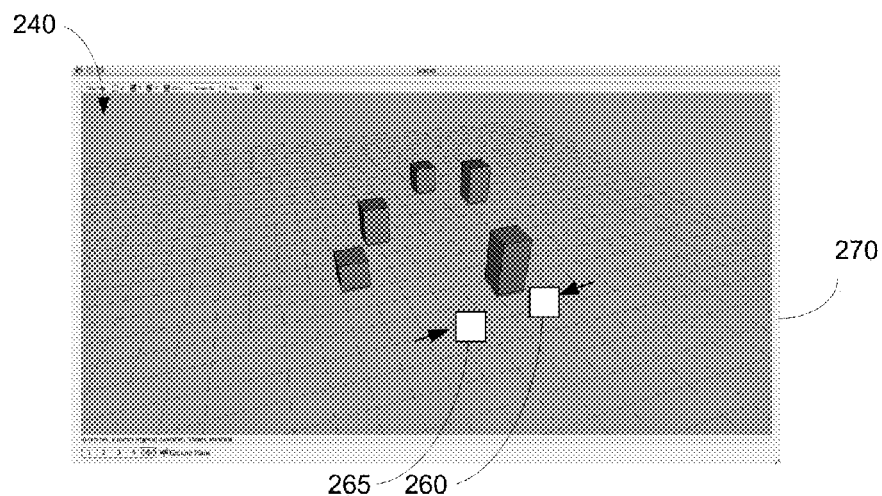

In the example in FIG. 3C, the user has moved their fingers together on sensing surface 30 to the illustrated locations: indicator 260 and indicator 265, while maintaining contact with sensing surface 30.

In various embodiments of the present invention, in response to the movement of the user's fingers, computer system 90 moves the position of the virtual camera with respect to scene 240. More specifically, in various embodiments, the position of the virtual camera is moved "away" from scene 240. In various embodiments, the virtual camera may move backwards along an optical axis of the virtual camera, while maintaining the same virtual camera tilt and/or pan, and in other embodiments, the tilt and pan parameters of the virtual camera may be modified. Scene 240 is then re-rendered as image 270, and displayed to the user.

Figure 3D:
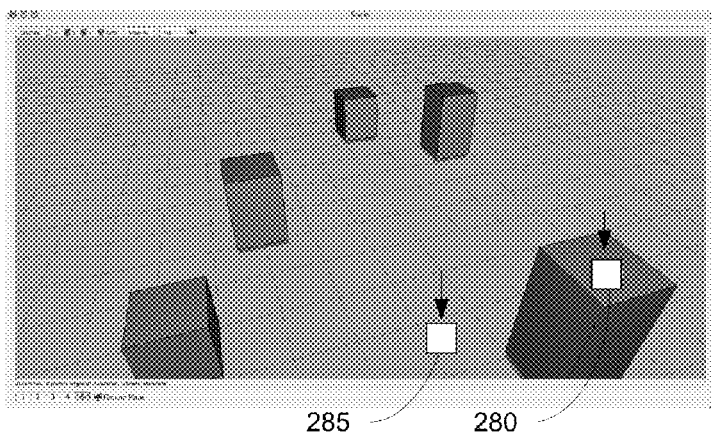

In the example in FIG. 3D, the user has moved their fingers downwards to the illustrated sensing surface 30 locations indicator 280 and indicator 285, while maintaining contact with sensing surface 30.

In various embodiments of the present invention, in response to the movement of the user's fingers, computer system 90 moves the position of the virtual camera with respect to scene 240. More specifically, in various embodiments, the position of the virtual camera is moved "forward" in scene 240 while maintaining the elevation. In other words, the position of the virtual camera is moved forward, parallel to the ground plane of scene 240. This may be in contrast to the examples in FIGS. 3B and 3C, where the elevation of the virtual camera is illustrated as changing. In various embodiments, the tilt and/or pan of the virtual camera are not changed. However, in other embodiments, similar to the examples in FIGS. 2A-D, a horizontal axis of rotation perpendicular to the virtual camera, or an object in interest may be defined. In such examples, as the placement of the virtual camera moves forward in scene 240, the tilt and pan parameters of the virtual camera also change. As above, scene 240 may then be rendered given the new position of the virtual camera, and then displayed to the user.

In various embodiments, as the user moves their two fingers upwards on sensing surface 30, the position of the virtual camera is moved "backwards" in scene 240, while also maintaining the elevation parallel to the ground plane. In various embodiments, the tilt and/or pan of the virtual camera may or may not change, similar to the above, depending upon specific user or engineering preference.

Similarly, in various embodiments, as the user moves their two fingers left or right on sensing surface 30, the position of the virtual camera may be moved left or right in scene 240. In various embodiments, this may be different from the embodiments discussed in FIG. 2C, as the tilt and/or pan of the virtual camera may not change. Thus, for example, as the user moves their two fingers to the right, the position of the virtual camera is shifted, laterally, to the left; as the user moves to the left, the position of the virtual camera is shifted, laterally, to the right, or vice versa. As above, scene 240 may then be rendered given the new position of the virtual camera, and then displayed to the user.

In still other embodiments of the present invention, the user may move one of the fingers upwards or downwards with respect to each other. As examples, the user may move a left finger downwards or upwards while the right finger moves upwards or remains stationary, or the user may move a right finger downwards or upwards while the left finger moves upwards or remains stationary. In various embodiments, based upon these relative movement directions, the virtual camera position may again be modified. In the present example, a roll parameter of the virtual camera about an optical axis of the virtual camera is modified. For example, if the left finger moves upwards relative to the right finger, the virtual camera may rotate clockwise about its optical axis, and as the right finger moves upwards relative to the left finger, the virtual camera may rotate counter-clockwise about its optical axis; or vice versa. In such embodiments, the virtual camera may maintain is height over a ground plane of scene 240. In other embodiments, the user may specify a different axis of rotation, or scene 240 may have a pre-defined axis of rotation for the present manipulation. Accordingly, the virtual camera would rotate about this defined axis of rotation, and the height of the virtual camera would most likely change.

In still other embodiments, degrees of motion of the virtual camera within the three-dimensional scene may be specified independently by the user, based upon the user input. For example, pan, tilt, and height, may be separately specified, and/or independent of an axis-of rotation within scene 240. In other embodiments, the placement of the virtual camera may be specified in other ways, such as with placement of three user fingers on sensing surface 30 and movement of the three user fingers, or the like.

In various embodiments of the present invention, it should be understood that the virtual camera may refer to settings used to determine the image as viewed by the viewer on computer display 10. Accordingly, the virtual camera need not refer to a virtual camera that is used as a basis for rendering final images. Instead, the virtual camera may be used as a basis of image visualization for a wide variety of purposes.

Figure 4A:
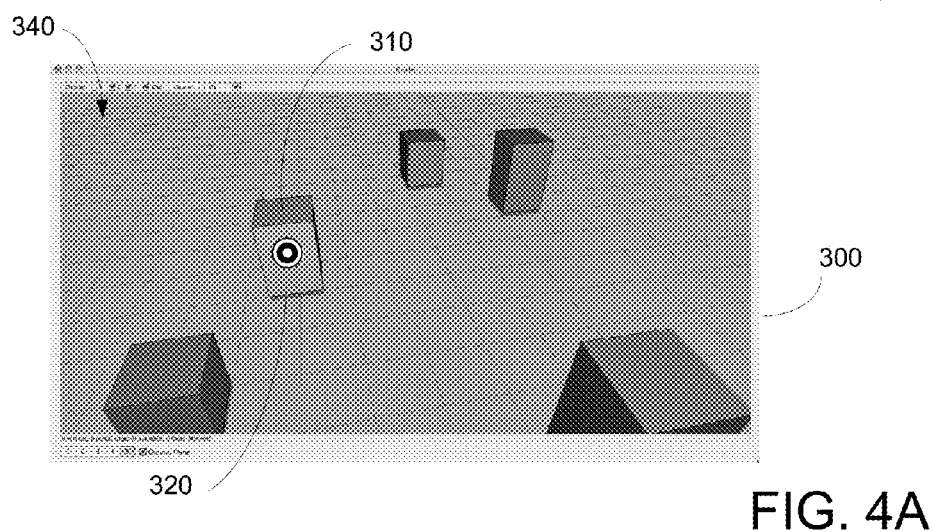
FIGS. 4A-F illustrate examples according to embodiments of the present invention.

FIGS. 4A-F illustrates examples according to various embodiments of the present invention. In various embodiments, within a three-dimensional animation environment, the positioning of select objects may be controlled by the user. More specifically, FIG. 4A illustrates an image 300 of a scene 340 as captured from the view point of a virtual camera. As can be seen, a number of virtual objects, such as virtual object 310 are illustrated within this animation environment.

As illustrated in FIG. 4A, an indicator 320 is displayed on image 300. In various embodiments, indicator 320 provides visual feedback as to where the user is contacting on sensing surface 30, as it correlates to image 300. In the present case, the user has selected object 310. In other embodiments, other visual feedback may be provided, or no visual feedback may be provided.

In various embodiments, similar to the examples in FIGS. 2A-D, the user may reposition the position of virtual object 310 to a certain extent, within the three-dimensional environment, using a single finger. For example, the position of virtual object 310 may be moved around the center of the three-dimensional scene, similar to FIG. 2B; or moved upwards above or downwards in the three-dimensional scene, similar to FIG. 2C; or combinations thereof, similar to FIG. 2D. In other embodiments, using a single finger, virtual object 310 may be moved around the three-dimensional environment at a fixed distance from the ground plane. In such embodiments, by constraining one dimension (distance from the ground plane), in most cases, when the user contacts sensing surface 300, a unique position for virtual object 310 can be determined.

In other embodiments, the user may use more than one finger to manipulate virtual object. In various embodiments, the user may use a second finger to contact sensing surface 30, and then move the fingers towards or away from each other. In response, the size of virtual object may increase or decrease, respectively, within the three-dimensional environment. In other embodiments, moving the fingers towards or away from each other may vary the height of virtual object 310 with respect to the ground plane or other geometric feature within the three-dimensional scene.

Further, in various embodiments, by moving two fingers upwards or downwards on sensing surface 30, virtual object 310 may be moved closer to the virtual camera or further away from the virtual camera. Other possible operations may include: by moving two fingers to the left or right on sensing surface, virtual object 310 may be moved towards the user's left or user's right; and combinations thereof. Still further, in various embodiments, by moving one finger relative to the other upwards or downwards, virtual object 310 may rotate about an axis of rotation. The axis of rotation may be the optical axis of the virtual camera, an axis defined between the center of virtual object 310 and the location of the virtual camera in the three-dimensional environment, or other defined axis.

Figure 4B:
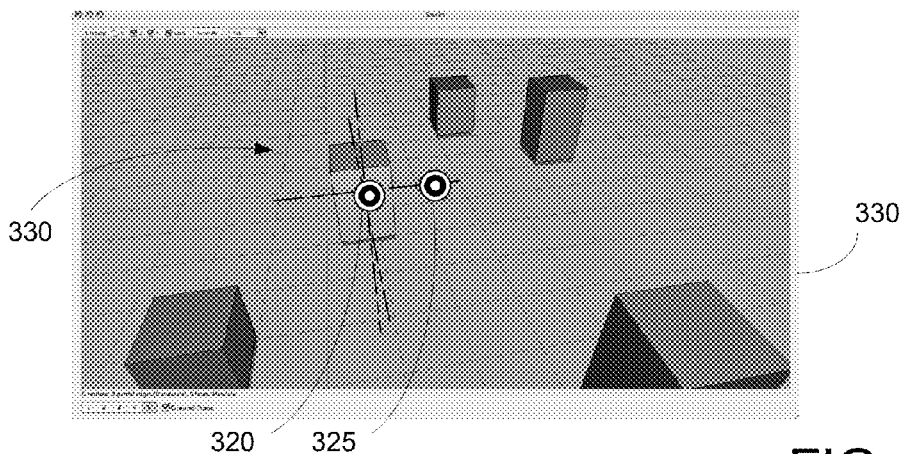

In various embodiments, as illustrated in FIG. 4B, once the user has selected virtual object 310, a number of geometric constraint indicators 330 may also be displayed to the user. In the present example, geometric constraints indicators 330 illustrate the three primary coordinates (e.g. x, y, z; r, theta, rho; or the like) for scene 340. In other embodiments, constraints may be orthogonal coordinates with respect to the optical axis of the virtual camera (i.e. where the camera is pointed); constraints may be based upon the object, itself, or other objects in the virtual 3D environment; or the like.

In the example in FIG. 4B, three primary coordinate axis are represented by lines, although in other embodiments, other types of indicators may be used. For example, large icons may be visually connected to the primary coordinate lines making it easier for the user to discriminate between the primary coordinate lines and making it easier for the user to make a selection. In other embodiments of the present invention, other types of geometric constraints are contemplated.

As illustrated in FIG. 4B, indicators 320 and 325 are displayed on image 300. In various embodiments, indicators 320 and 325 (or other shapes) again provide visual feedback as to where the user is contacting on sensing surface 30, as it correlates to image 300. In various examples, indicators 320 and 325 may indicate where two fingers of one hand of the user are contacting sensing surface 30, where one finger of each hand of the user are contacting sensing surface 30, or the like.

In FIG. 4B, indicator 320 indicates the user selection of object 310 and indicator 325 indicates a user selection of one of geometric constraint indicators 330. As will be illustrated below, the user selection of a geometric constraint constrains the geometric position of object 310 in response to further user input. In FIG. 4B, the selected geometric constraint is a horizontal axis of a coordinate system of the virtual three-dimensional environment.

Figure 4C:
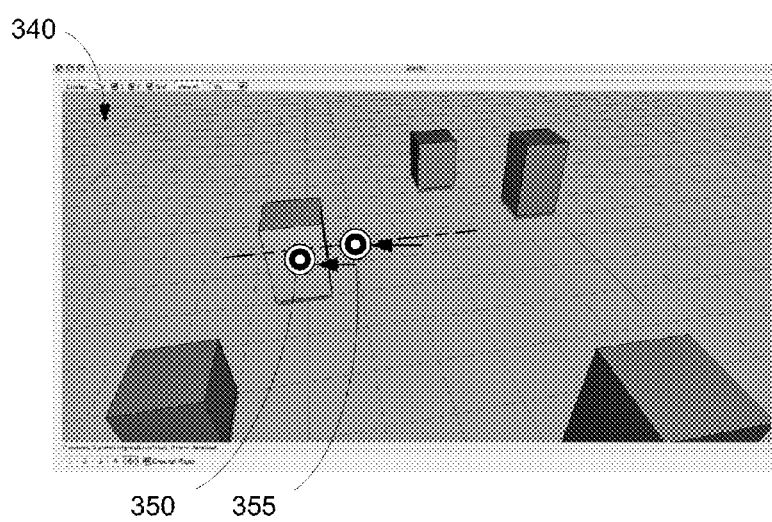

As illustrated in FIG. 4C, the user has maintained the contact (or substantial contact) of the fingers, and has moved the fingers to the left—indicator 320 has moved to indicator 350, and indicator 325 has moved to indicator 355. As can be seen, in response to the movement of the user's fingers, computer system 90 moves the position of object 310 within scene 340 towards the user's left, to where indicator 350 is located. In this example, the position of object 310, is constrained along the selected geometric constraint (i.e. horizontal axis) of the three-dimensional scene, as can be verified by referring to the underlying grid.

Figure 4D:
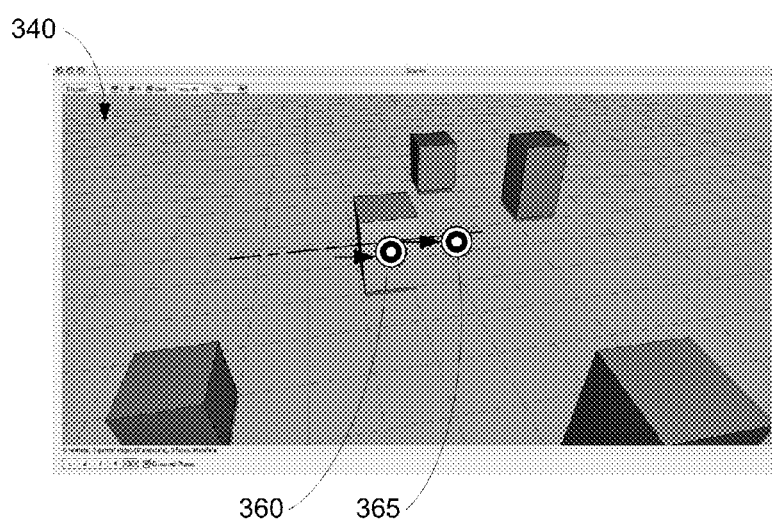

As illustrated in FIG. 4D, the user has maintained the contact (or substantial contact) of the fingers, and has moved the fingers to the right, moving indicator 320 to indicator 360 and indicator 325 to indicator 365. As can be seen, in response to the movement of the user's fingers, computer system 90 moves object 310 towards the user's right, to where indicator 360 is located. In this example, the position of object 310 is also constrained along the selected horizontal axis of the three-dimensional scene.

In various embodiments of the present invention, geometric constraints 330 of FIG. 4B may also be associated with rotations about the primary coordinate axes of scene 340, about coordinate axes of the virtual camera, about coordinate axes of the object, or other objects in the virtual 3D environment; or the like.

Figure 4E:
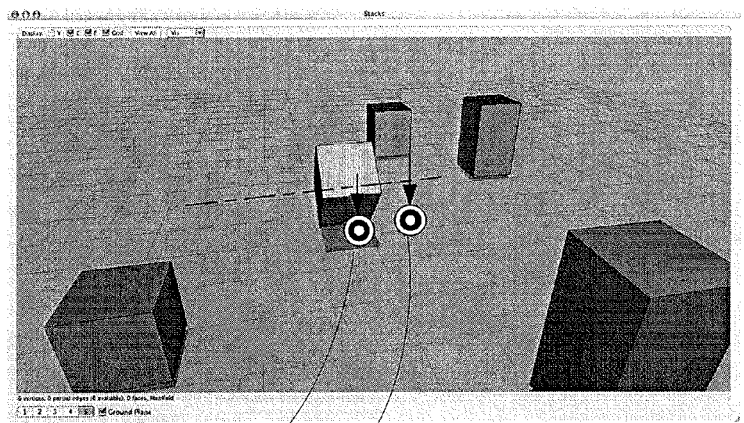

As illustrated in FIG. 4E, the user has maintained the contact (or substantial contact) of the fingers, and has moved the fingers to the downwards, moving indicator 320 to indicator 370 and indicator 325 to indicator 375. As can be seen, in response to the movement of the user's fingers, computer system 90 rotates object 310 forwards, towards the user. In this example, object 310 is also constrained to be rotated along the selected horizontal axis of the three-dimensional scene. Of course upwards movements of the user's fingers may be associated with a rotation away from the user along the horizontal axis, or vice versa. Accordingly, as can be seen, for a geometric constraint such as a geometric axis, an object may be constrained to move along the geometric axis, rotated about the geometric axis, or a combination thereof (e.g. an axis move and a rotation).

Figure 4F:
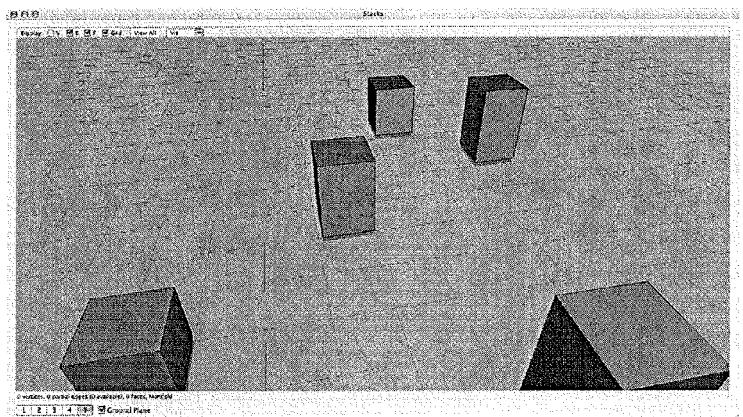

In various embodiments, by removing the user's second finger from sensing surface 30, the geometric constraint is released. Further, as the user removes their first finger from contacting sensing surface 30, the object is de-selected, as illustrated in FIG. 4F.

Figure 5A:
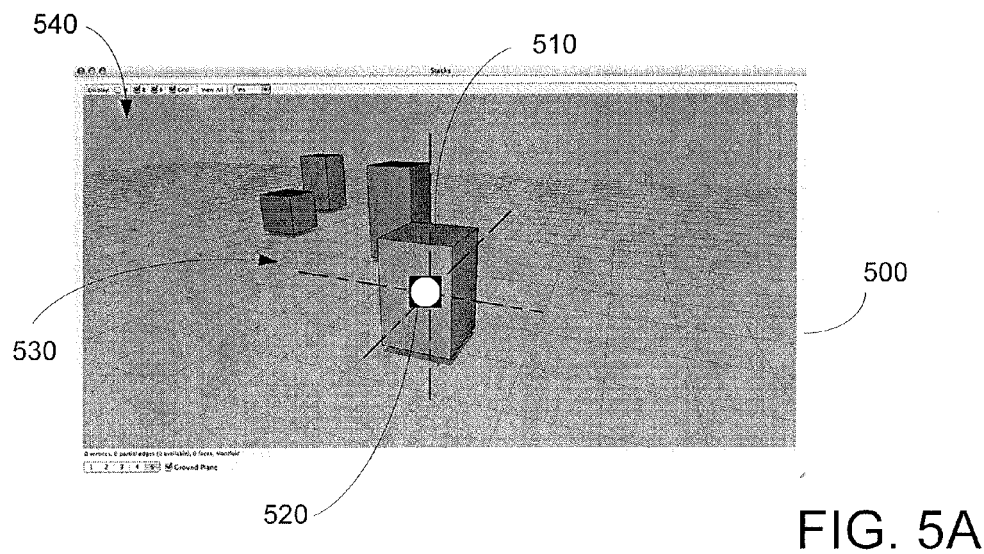
FIGS. 5A-C illustrate examples according to embodiments of the present invention.
Figure 5B:
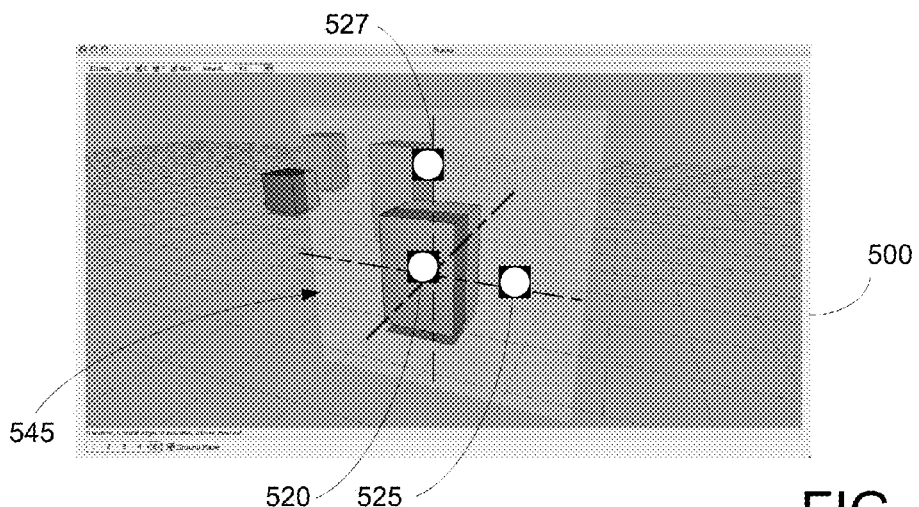
Figure 5C:
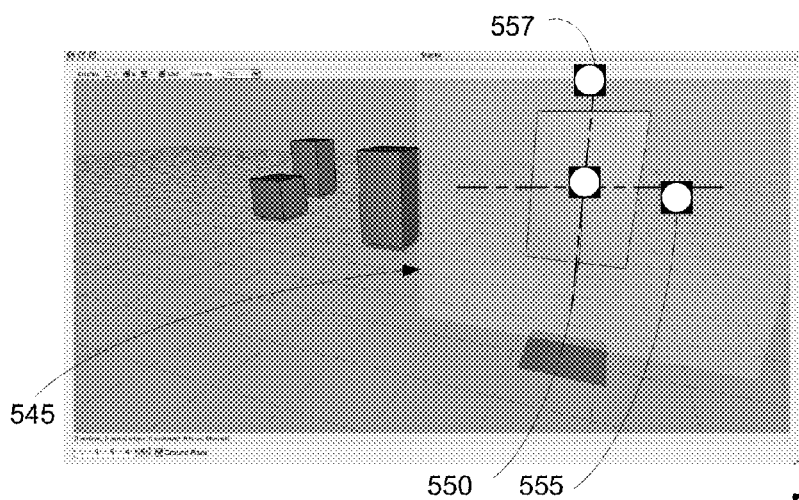

FIGS. 5A-C illustrates examples according to various embodiments of the present invention. More specifically, FIGS. 5A-C illustrate the selection of simultaneous geometric constraints. Similar to FIG. 4B, above, once the user has selected virtual object 510, shown by indicator 520, a number of geometric constraint indicators 530 may be displayed to the user. In the present example, geometric constraints indicators 530 illustrate the three primary coordinates (e.g. x, y, z; r, theta, rho; or the like) for scene 540, although in other embodiments, constraints may be orthogonal coordinates with respect to the optical axis of the virtual camera (i.e. where the camera is pointed); constraints may be based upon the object, itself, or other objects in the virtual 3D environment; or the like.

In the example in FIG. 5A, three primary coordinate axis are represented by lines, although in other embodiments, other types of indicators may be used. Additional icons may be used for geometric constraint indicators 530, for the user's convenience.

In the example in FIG. 5B, the user places two more fingers upon sensing surface 30, as illustrated by indicators 525 and 527 on image 500. Similar to the above, the indicators provide visual feedback as to where the user is contacting on sensing surface 30, as it correlates to image 500. In various examples, indicators 520, 525, and 527 may indicate where three fingers of one hand of the user are contacting sensing surface 30, where two fingers of one hand and one finger of the other hand of the user are contacting sensing surface 30, or the like.

In the example in FIG. 5B, indicators 525 and 527 indicate the user selection of two of geometric constraint indicators 530. In FIG. 5B, the selected geometric constraints are geometric axes of the virtual 3D environment and define a vertical plane 545 within the virtual 3D environment. In other embodiments, virtual object 510 may be constrained to any of three geometric planes within the virtual 3D environment, or the like.

In FIG. 5C, the user has maintained the contact (or substantial contact) of the fingers, and has moved the fingers to up and to the user's right—e.g. indicator 520 has moved to indicator 550, indicator 525 has moved to indicator 555, and indicator 527 has moved to indicator 557. In this example, the positions of the other fingers, specifying the geometric constraints is not shown, for convenience. As can be seen, in response to the movement of the user's fingers, computer system 90 moves the position of object 510 within scene 540 within vertical plane 545 upwards and to the user's right, to where indicator 550 is located. In various embodiments, by removing the user's second and third fingers from sensing surface 30, the geometric constraints are released.

In additional embodiments of those illustrated in FIGS. 4A-F and FIGS. 5A-C, the user may lift-off various fingers from sensing surface 30 during the respective operations. This may be convenient for the user, instead of requiring the user to maintain contact of all fingers. In various embodiments, the fingers that remain in contact with sensing surface 30 are considered by computer system 90 as a priority selection by the user. For example, in FIG. 4B, if the user removes their second finger associated with indicator 325 from sensing surface 30, object 310 remains selected. In contrast, if the user removes the first finger associated with indicator 320, the selected geometric constraint remains. Accordingly, when the user moves their second finger about sensing surface 30, object 310 moves, but is constrained to moving along the horizontal axis, similar to FIGS. 4C and 4D, or is constrained to rotating along the horizontal axis, similar to FIG. 4E. In the example in FIG. 5B, the user may remove their first finger associated with indicator 520, and maintain contact with their second and third fingers. Accordingly, when the user moves their second and third finger about sensing surface 30, object 510 moves, but is constrained to moving along the vertical plane.

In various embodiments, the order in which the user lifts-off their fingers is associated with whether a geometric constraint is "permanent" (maintained after a finger lift-off) or temporary (not maintained after a finger lift-off). As an example, referring back to the example in FIG. 4B, if a user lifts-off their first finger (indicator 320) while maintaining their second finger (indicator 325), the selected geometric constraint is "permanent." Later, when the user lifts-off their second finger (indicator 325), object 310 is de-selected. Subsequently, when the user re-selects object 310 with their first finger, the geometric constraint is automatically reapplied, even though the user has not placed their second finger on sensing surface 30. Accordingly, under the geometric constraint, the user manipulation of object 310 will be constrained to movement along the horizontal-axis or rotation around the horizontal-axis, in this example. In various embodiments, a visual indicator may be displayed to the user to indicate that a geometric constraint is currently "permanent." As an example, an object with "permanent" geometric constraints may be highlighted in red, while non-selected geometric constraints may be blue, or the like.

As another example, referring to the example in 5B, to make the vertical geometric constraint "permanent," the user removes their first finger (indicator 520) while maintaining the second and third fingers (indicators 525 and 527). Later, the user lifts-off their second finger and third fingers, and object 510 is de-selected. Subsequently, when the user re-selects object 510 with their first finger, the vertical plane geometric constraint is automatically reapplied, even though the user has not placed their second or third fingers on sensing surface 30.

In various embodiments, to release a "permanent" geometric constraint, the user may select the geometric constraint with their second finger while maintaining the contact of the first finger with sensing surface 30. Then, the user lifts-off their second finger, before lifting-off the first finger from sensing surface 30. In response, computer system 90 removes any "permanent" geometric constraints. In other embodiments, a user may simply select the object and tap on the object to release "permanent" constraints. As can be seen, the order of finger lift-offs may be used by computer system 90 for various purposes.

Figure 6A:
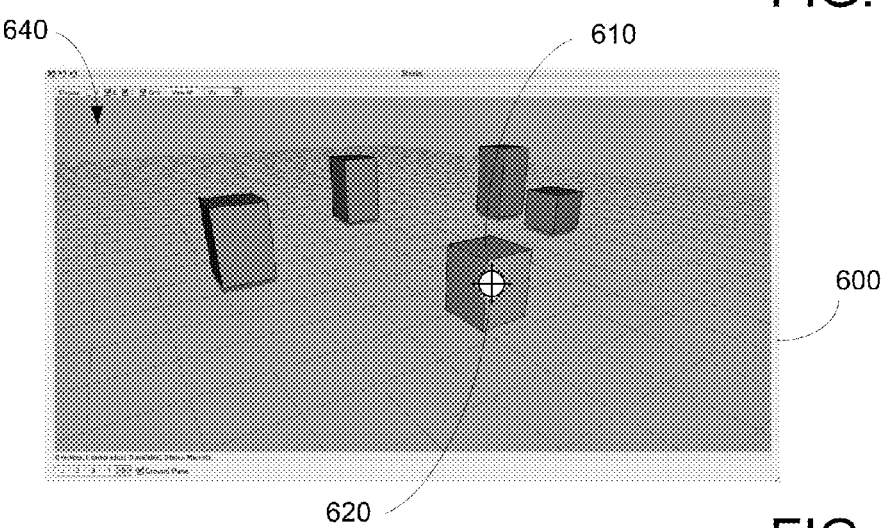
FIGS. 6A-C illustrate examples according to embodiments of the present invention.
Figure 6B:
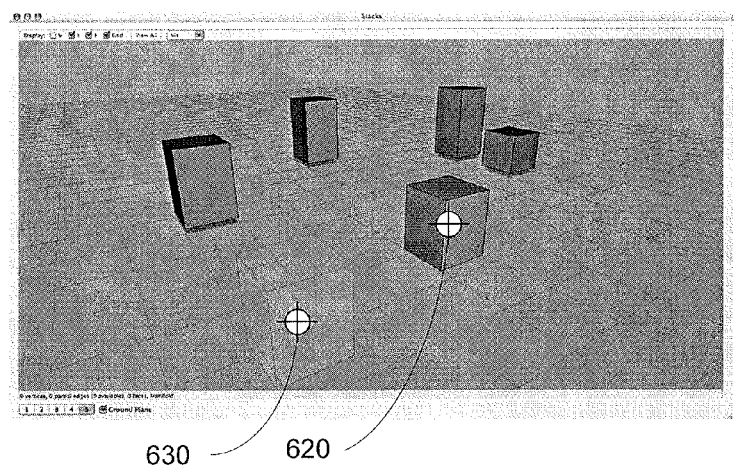
Figure 6C:
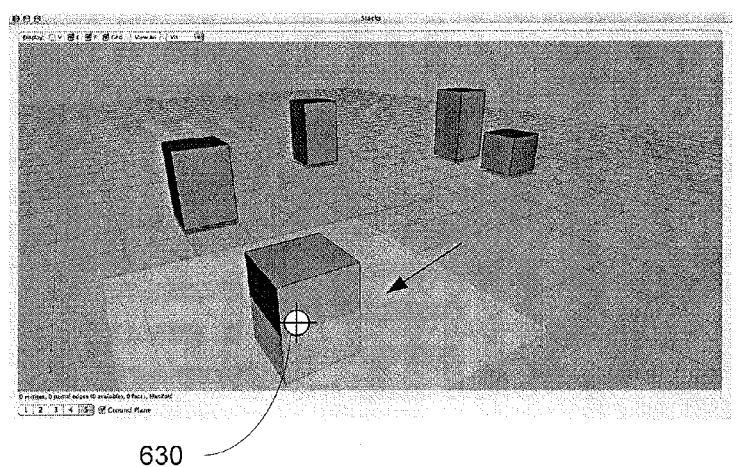

FIGS. 6A-C illustrates additional examples according to various embodiments of the present invention. In various embodiments, a high speed method for repositioning objects within a three-dimensional animation environment is enabled.

In FIG. 6A, an image 600 of a scene 640 as captured from the view point of a virtual camera viewing a three-dimensional scene. As can be seen, a number of virtual objects, such as virtual object 610 are illustrated within this animation environment. As illustrated in FIG. 6A, an indicator 620 is displayed on image 600 to provide a user with visual feedback as to where the user is contacting on sensing surface 30.

In various embodiments, as illustrated in FIG. 6B, once the user has selected virtual object 610, the user may select a second point on image 600, such as indicator 630. In various embodiments, because sensing surface 30 may be large (e.g.

40" inches diagonal, 72" diagonal, or the like), the inventors have recognized that dragging the user's finger across a large display to move objects may be burdensome. Accordingly, in various embodiments, a user could use fingers of separate hands to contact sensing surface 30. For example, indicator 620 may be associated with the user's right hand, and indicator 630 may be associated with the user's left hand.

Next, as illustrated in FIG. 6C, as the user releases their right hand, this causes indicator 620 to disappear, and virtual object 610 is automatically moved (e.g. "teleported") to indicator 630. In various embodiments, virtual object 610 maintains its positioning with respect to the ground plane. This functionality would be similar to the user defining a horizontal plane constraint for an object, as described above, with three fingers, and dragging the three fingers all the way from indicator 620 to indicator 630. Requiring the user to maintain contact and drag their figures may be considered unwieldy or difficult for some users to do. Accordingly, embodiments of the present invention, described above may provide a user with this movement capability without being difficult to use. As can be seen in FIGS. 6A-C, the present embodiments allow the user to very efficiently reposition virtual objects within the three-dimensional animation environment.

In other embodiments of the present invention, a user may select an object by contacting sensing surface 30 with their finger or the like. The user may then quickly move their finger in a selected direction and break the contact of their finger with sensing surface 30. To the user, the object will appear to be thrown in the virtual environment in the selected direction. In various embodiments, the user may then contact the same or different finger on sensing surface 30 in the general direction where the object is thrown. In response, to the contact, the object may be snapped to or caught by the other finger contact position on sensing surface 30. In various embodiments of the present invention, a second contact location on sensing surface 30 need not be specified. In such embodiments, a predefined or default destination for the object may be specified. For example, a user may virtually throw an object off the right edge of sensing surface 30, thereby automatically deleting the object from the working environment; the user may virtually throw the object off the left edge of sensing surface 30, thereby requesting an updated version of the object to be retrieved from memory; the user may virtually throw the object off the bottom edge of sensing surface, thereby putting the object in a queue; or the like. In various embodiments, any number of operations may be performed in response to the object being caught at various locations or moving off the edge of sensing surface 30, such as storing the object, deleting the object, moving the object, executing a program using the object as input data, e-mailing the object, faxing the object, transmitting the object over a network, time stamping the object or the like.

FIGS. 7A-D illustrate various embodiments of the present invention. More specifically, these figures illustrate novel graphical user interface techniques that reduce typical computer display interface clutter. Screen clutter is often a problem with highly complex software, as functional menus, toolbars, pallets, tear-off menus, and the like, disadvantageously reduce the actual working space. Typical complex software may include three-dimensional animation software (e.g. Maya), two-dimensional paint programs (e.g. Photoshop), office productivity programs (e.g. Word), or the like.

Figure 7A:
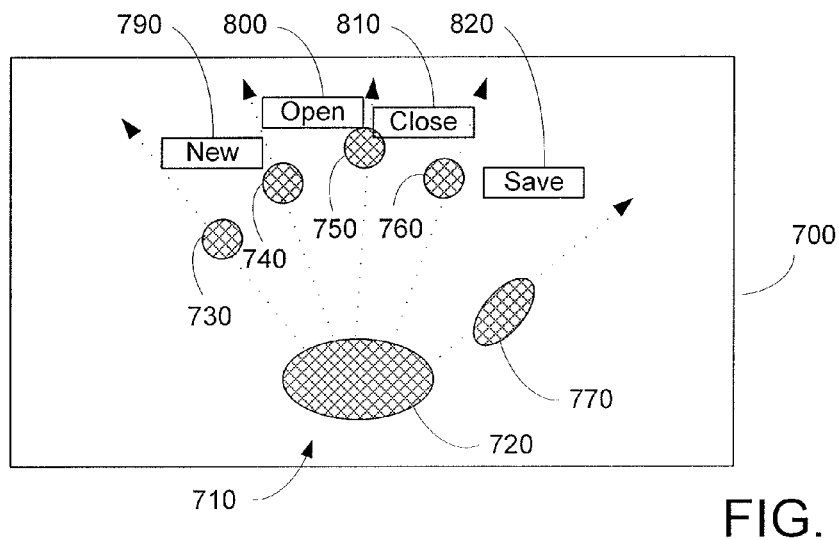
FIGS. 7A-D illustrate additional examples according to embodiments of the present invention.

Various embodiments of the present invention are illustrated in FIG. 7A. FIG. 7A includes a number of positions 710 in image 700 that represent portions of a user's hand contacting sensing surface 30. More specifically, a position 720 is associated with a palm, positions 730-760 are associated with fingers, and position 770 is associated with the thumb of the user. In various embodiments, before a hand of a user contacts sensing surface 30, the hand may be recognized as a hand. In such cases, when the user makes contact, the system is ready to process the inputs, as described below.

In various embodiments, computer system 90 includes a number of positional patterns that are associated with different types of commands, menus, or the like. For example, computer system 90 may recognize positions 710 (a left hand) as being associated with a first type of commands, such as file menu commands, e.g. open, close, save, print, and the like. Further, computer system 90 may recognize positions of a right hand as being associated with a second type of commands, such as edit-type commands, e.g. cut, copy, paste, paste-special, and the like. As still another example, computer system 90 may recognize positions 780, in FIG. 7B, as being associated with a third type of commands, such as select menu commands, e.g. select all, deselect, reselect, inverse, grow, and the like. In light of the present disclosure, one of ordinary skill in the art would recognize that many other combinations, types, orientations, or the like of positions may be defined and be associated with any number of commands, menus, or the like.

In the example in FIG. 7A, computer system 90 determines that positions 710 are associated with a file-type commands. In response, a number of commands, or sub-menus are retrieved and displayed to the user. More specifically, functional commands or sub-menus are associated with an icon that may include images and/or text, and are displayed on computer system display 10. In FIG. 7A, for example, icon 790 is associated with a new file command, icon 800 is associated with a open file command, icon 810 is associated with a close command, icon 820 is associated with a save command, or the like. In various embodiments, the menu icons, sub-menu icons, or the like can be determined and/or retrieved in memory before the user makes any contact with sensing surface 30.

Figure 7B:
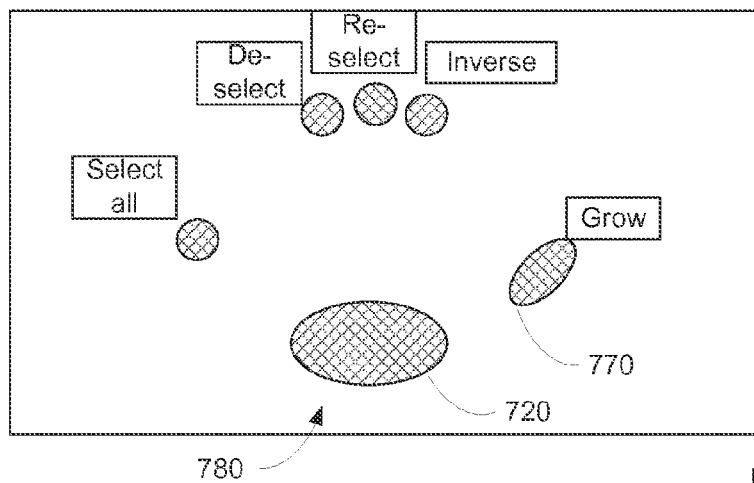
Figure 7C:
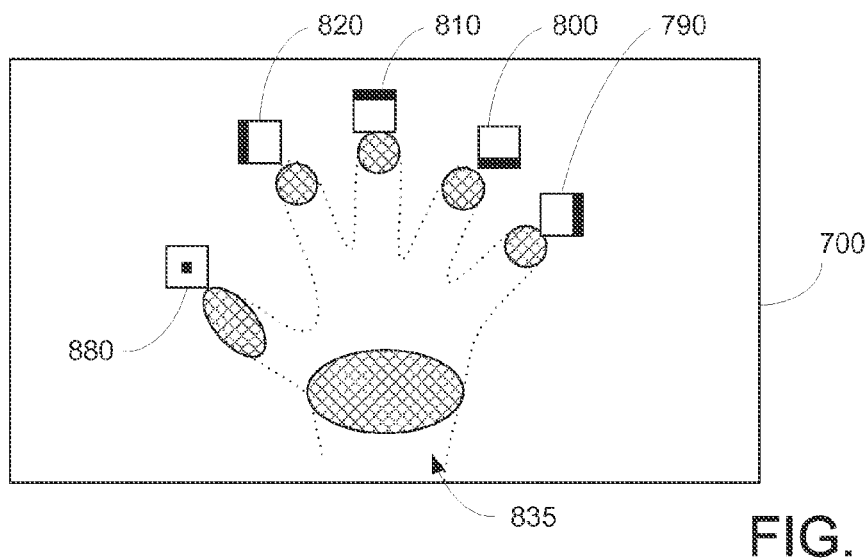

In the example in FIG. 7C, computer system 90 determines that positions 835 are associated with object alignment type commands. In response, a number of icons representing commands, or sub-menus are retrieved and displayed to the user. More specifically, in FIG. 7C, for example, icon 840 is associated with align left command, icon 850 is associated with an align top command, icon 860 is associated with a align bottom command, icon 870 is associated with an align right command, icon 880 is associated with an align center command, or the like.

In other embodiments of the present invention, icons may be represented by sub-menus. Accordingly, a user may select a first icon on the display, and in response computer system 90 displays another set of icons associated with the same positions. As an example, a first set of icons related to view menu icons, such as normal view, layout view, zoom view, and toolbars are associated with icon positions 850-880. When the user selects the toolbars icon, another list of icons are then displayed to the user. As an example, the new icons may include a standard toolbar, a drawing toolbar, a materials toolbar, and the like and will be associated with icon positions 850-870, or the like. The user may then have a material toolbar pop-up by selecting the icon 870.

In other embodiments of the present invention, the menu commands may be used to enable a user to set-up their working environment preferences, or the like. For example, one finger is associated with an animation environment command mapping, a second figure is associated with a rigging environment command mapping, and the like. In various embodiments, it is contemplated that a user may switch back and forth between command mappings by invoking the appropriate menu user interface and selecting the appropriate finger.

Figure 7D:
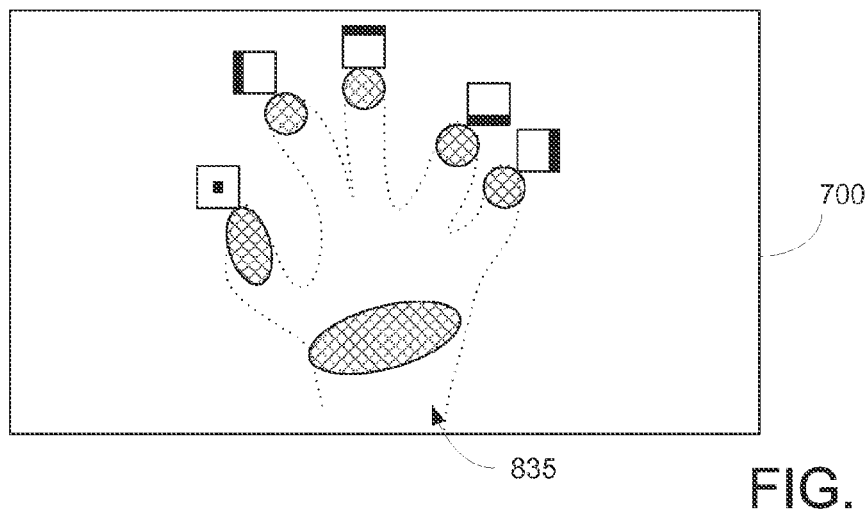

As can be seen in FIGS. 7A-7C, the placement of the icons depend upon the geometry of the user's hand, for example. As examples, for a user with large hands, the displayed icons would be placed further away from the position of the user's palm, than for a user with smaller hands. As another example, if a user has different hand geometry, e.g. crooked or short fingers, as illustrated in FIG. 7D, the icons will still be displayed above their fingers compared to a user with straight fingers, as illustrated in FIG. 7C.

In various embodiments of the present invention, many different ways for a user to select a functional icon are contemplated. For example, with regards to FIG. 7A, a user may user their other hand to select a location between any two fingers to select one of icons 790-820. In this example, the regions between the fingers can serve as selection regions. In other examples, these regions may project beyond positions 730-770, making it easier for the user to select a specific functional icon.

In other examples, as illustrated in FIG. 7C, a user may select one of icons 840-880 in a number of ways. In some embodiments, the user uses a finger of their other hand to select the functional icon desired. In other embodiments, the user may lift-off and/or tap the finger associated with the desired icon. In still other embodiments, the user may lift-off all fingers while maintaining the finger associated with the functional icon desired. Other ways to indicate user selection may also be used, such as through voice command, or the like.

In other embodiments, computer system 90 recognizes positions associated with the user placing only their palm on sensing surface 30. In response, menu icons may be retrieved and placed where it is expected that fingers would be placed upon sensing surface. Then, to select one of the icons, the user may simply place a finger upon the desired icon.

As mentioned above, in various embodiments of the present invention, when the hand of the user is in proximity of sensing surface (with or without contact), computer system 90 may determine that proximity. In various embodiments, an additional image or sensing device may be placed between the user's hand and sensing surface 30, or underneath sensing surface 30 and capturing images of the user's hand. Based upon the image or sensing device, in various embodiments, computer system 90 may determine which hand (s) of the user are proximate to sensing surface 30, the orientation of user's hands (e.g. pointed left, right), the identity of the fingers, or the like.

In various embodiments of the present invention, the user may hover their hand above sensing surface 30 without contacting sensing surface 30. In response, computer system 90 may identify one or more the fingers (e.g. thumb, pointer, pinky). Next, the user may contact one of their fingers to sensing surface 30. Since computer system 90 can identify each of the fingers of the hovering hand, it may also identify which finger is used to contact sensing surface 30. For example, computer system may determine that the user used their ring finger to contact sensing surface 30, the user used their thumb, or the like. Based upon which finger contacts sensing surface 30, computer system 90 may perform a specific function.

In various embodiments of the present invention, when the user hovers their hand over sensing surface 30, a number of menu commands are associated with the user's fingers in the memory of computer system 90. Then, based upon which finger the user contacts sensing surface 30, the corresponding menu command may be performed. As an example, referring to FIG. 7B, the user need not contact their hand to sensing surface 30, as illustrated in positions 780. Additionally, the functional commands illustrated, e.g. select all, de-select, re-select, etc. need not be displayed on sensing surface 30. In such embodiments, when the user contacts their pointer finger to sensing surface 30, in this example, the inverse command is performed. In various embodiments, it is envisioned that a user may be familiar with the commands associated with fingers, thus display of the menu commands, or the like need not be performed.

In various embodiments of the present invention, the location the user contacts upon sensing surface 30 may also be used to determine the function performed. In various examples, as a user hovers their hand, or the like, above sensing surface 30, computer system 90 again recognizes the hand and logically assigns fingers of the hand to particular commands. As an example, a pointer finger is logically assigned a delete command, a thumb is logically assigned a duplicate command, and a middle finger is logically assigned with an application program. In operation, the user my contact their finger upon sensing surface 30, and in response, computer system 90 recognizes the contact location as a portion of an object in two-dimensional or three-dimensional space. Accordingly, if the contact finger on sensing surface 30 is the thumb, the object will be duplicated; if the contact finger on sensing surface 30 is the pointer finger, the object will be deleted; if the contact finger on sensing surface is the middle finger, an application program will be executed using the object as a data source (e.g. an input data file); and the like. In another example, for a right hand, if the contact finger on sensing surface 30 is a first finger, a three-dimensional object may be constrained to rotate along a vertical axis as the first finger is moved; if the contact finger is a second finger, the three-dimensional object may be constrained to rotate along a first horizontal axis as the second finger is moved; if the contact finger is a third finger; the three-dimensional object may be constrained to rotate along a second horizontal axis as the third finger is moved; if the if the contact finger is a fourth finger, the three-dimensional object may be constrained to move parallel to a ground plane as the fourth finger is moved; if the if the contact finger is a fifth finger, the three-dimensional object may be constrained to move vertically, perpendicular to a ground plane as the fifth finger is moved; additionally, or alternatively, for the left hand, if the contact finger on sensing surface 30 is a first finger, the object may be deleted or pushed away from its current position; if the contact finger is a second finger, the model of the three-dimensional object may be reverted to a saved version; if the contact finger is a third finger; the object may be grouped with other objects; if the if the contact finger is a fourth finger, specific properties of the three-dimensional object may displayed to the user (e.g. associated surface properties, object version, modified geometric parameters, animation variables, or the like); if the if the contact finger is a fifth finger, a specific window may be opened from which a user may edit the three-dimensional object (e.g. manipulate values for animation variables graphically, via numeric entry, or the like). In various embodiments, definition of the "first," "second," "third" or the like fingers may be arbitrary, and need not map linearly to any ordering of fingers of the user's hand. As an example of this, a "first" finger may be a right hand ring finger, a "second" finger may be a left hand thumb, a "third" finger may be right hand thumb, or the like. In light of the present disclosure, one of ordinary skill in the art will recognize a wide variety of functionality that is now enabled through the combination with contact location of sensing surface 30, and the finger or fingers of the user that perform the contacting. Additionally, in light of the present disclosure, one of ordinary skill in the art will recognize that embodiments of the present invention may be applied to enhance any graphical user interface (two-dimensional, three-dimensional) of any other computing device (e.g. PDA, smart phone, internet device, digital television, kiosk, desktop computer, portable computing device, or the like).

In other embodiments of the present invention, a user may select an icon, menu item, link, web page, or the like, by contacting sensing surface 30 with their finger or the like. Similar to the above object movement, described above, the user may then quickly move their finger in a selected direction and break the contact of their finger with sensing surface 30. To the user, a iconic representation of the selected icon, menu item, link, web page, or the like will appear to be thrown in the virtual environment in the selected direction. In various embodiments, the user may then contact the same or different finger on sensing surface 30 in the general direction where the object is thrown (e.g. a folder icon, a garbage can icon). In response, to the contact, the object may be snapped to or caught by the other finger contact position on sensing surface 30. In various embodiments of the present invention, a second contact location on sensing surface 30 need not be specified. In such embodiments, a predefined or default destination for the object may be specified. For example, a user may virtually throw an a web page to off the right edge of sensing surface 30, thereby automatically saving the web page to a bookmark folder; the user may virtually throw the object off the left edge of sensing surface 30, thereby saving the image in a pictures folder; the user may virtually throw the object towards a folder icon appearing on sensing surface 30, thereby creating a .pdf image of a web page, document, or the like and storing the image; or the like.

Figure 8:
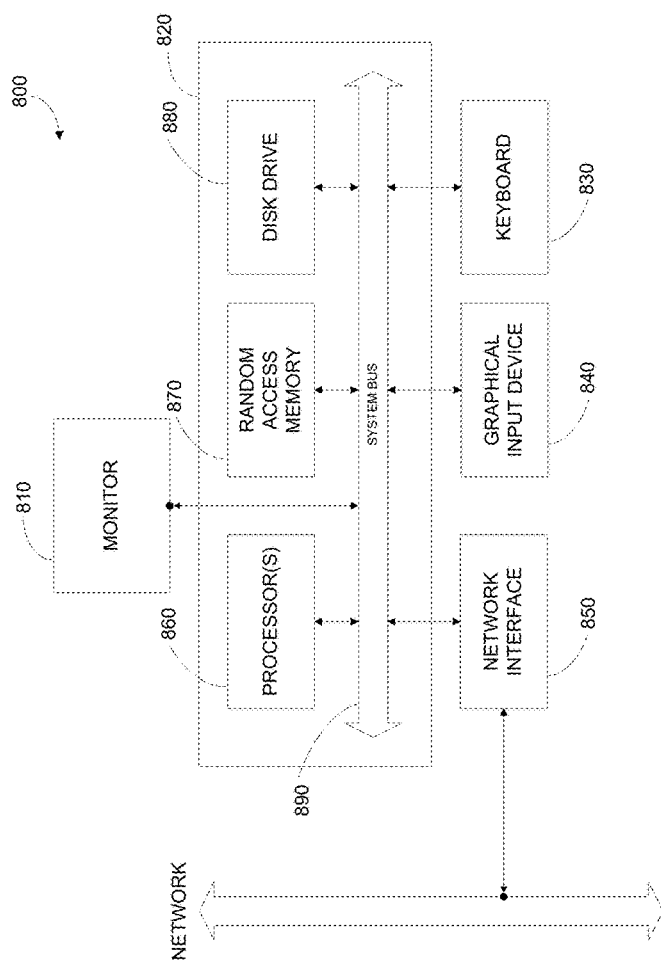
FIG. 8 illustrates a block diagram of a computer system according to various embodiments of the present invention.

FIG. 8 is a block diagram of typical computer system 800 according to various embodiment of the present invention. In various embodiments, computer system 800 typically includes a monitor 810, computer 820, a keyboard 830, a user input device 840, a network interface 850, and the like.

In the present embodiment, user input device 840 is typically embodied as a computer mouse, a trackball, a track pad, wireless remote, and the like. User input device 840 typically allows a user to select objects, icons, text, control points and the like that appear on the monitor 810. In some embodiments, monitor 810 and user input device 840 may be integrated, such as with an interactive screen display or pen based display such as a Cintiq marketed by Wacom, computer system display 10, or the like.

Embodiments of network interface 850 typically include an Ethernet card, a modem (telephone, satellite, cable, ISDN), (asynchronous) digital subscriber line (DSL) unit, and the like. Network interface 850 are typically coupled to a computer network as shown. In other embodiments, network interface 850 may be physically integrated on the motherboard of computer 820, may be a software program, such as soft DSL, or the like.

Computer 820 typically includes familiar computer components such as a processor 860, and memory storage devices, such as a random access memory (RAM) 870, disk drives 880, and system bus 890 interconnecting the above components.

In one embodiment, computer 820 is a PC compatible computer having multiple microprocessors such as Xeon™ microprocessor from Intel Corporation. Further, in the present embodiment, computer 820 typically includes a UNIX-based operating system.

RAM 870 and disk drive 880 are examples of tangible media for storage of animation asset data, audio/video files, computer programs, operating system, embodiments of the present invention, including rendering engines, program code configured to direct computer system 800 to perform the above described functions, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 8 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

In light of the above disclosure, one of ordinary skill in the art would recognize many modifications that are considered within the scope of the present disclosure. For example, in various embodiments of the present invention, a velocity of movement of the user contacting the sensing surface may be interpreted by the computer system. For example, a user may select an object and then quickly move in a specific direction and lift-off their finger. In such a case, the computer system may interpret such a sequence of events as moving the object further along the direction of movement than where the user lifted-off their finger, or the like.

In some embodiments of the present invention, the computer system may track rotational position of contact locations on the sensing surface. For example, the user may place their entire hand onto the sensing surface and rotate their hand, such that the fingers point in different directions. In various embodiments, the regions between the fingers of the user may be associated with particular commands based upon direction. For example, when the fingers are pointed to the right, a first menu of commands is retrieved, when the fingers are pointed to the left, a second menu of commands is retrieved, and the like.

In other embodiments of the present invention, menu commands displayed to the user may be "dropped" on top of objects on the display to effect a given command. As an example, two objects are selected in the virtual three-dimensional space, and the region between the user's thumb and pointer finger is associated with an "align in x-axis command," the region between the user's pointer and middle fingers is associated with an "align in y-axis command," the region between the user's middle and ring fingers is associated with an "align in z-axis command." In this example, the user places their hand onto the sensing surface and then pivots or moves their contacting hand until the region between the middle and ring fingers includes the two selected objects on the display. In response, the two select objects are displaced and aligned in the z-axis in three-dimensional space. In light of the present disclosure, one of ordinary skill in the art will understand that many types of commands may be "dropped" upon objects to manipulate the selected objects, such as assignment of surface parameters, deformations, retrieving particular versions of objects (e.g. latest versions), and the like.

Various embodiments of the present invention may be applied within an animation system to perform inverse kinematics for a model of an object. In one example, a user may contact the display to select one portion of an object model and move it in three-dimensional space. In response to the movement, the computer system moves the other portions of the model to fit the position specified by the user. As an example, for a skeleton-type model, if the user selects a hand and moves it upwards, the fore arm, upper arm, and shoulder of the model all move upwards. In various embodiments, constraints may be placed upon movement of portions of the object model, again, by contacting the sensing surface. For example, the user may place two fingers upon a first portion of the object model to constrain its position, and with their other hand, select a second portion of the model, and move it around, as discussed above. In such a case, the second portion of the model would not move. In various embodiments, a temporary constraint on movement may be specified by a user constantly contacting two fingers on the constrained portion, and a permanent constraint (until released) on movement may be specified by a user contacting a portion of the object model with three fingers, or the like.

In various embodiments of the present invention, the inventors recognize that sequences of contacting, movement, lift-off, and the like may be mapped to different computer system commands, based upon the application with three-dimensional space. For example, an object rigger will have different types of needs than an object animator, a lighter will have different needs than a set dresser, and the like. Accordingly, the inventors have determined that it is desirable to map the different user inputs to different computer system commands in a flexible way. One such method is via a custom configuration file for each application or end-user that associates patterns of user contacts with specific menus, commands, or the like. The patterns may be similar for similar classes of users, but also user customizable.

In other embodiments, the contacting, sequence of contacting, sequence of lift-offs, motions of contacting, or the like may be used for security purposes, may be used for music creation, may be used for virtual musical instruments, and the like. In various embodiments, the user may be required to contact pre-determined locations on the screen with one or more fingers to be able to access programs and/the computer system. Additionally, the user may be required to move their fingers in certain patterns (e.g. a circle, a twisting pattern) and/or perform these actions within a set amount of time. In other embodiments, these motions may be combined with finger contact taps (e.g. tap-downs, lift-offs).

In other embodiments, manipulations by the user may be of an object in three-dimensions. As an example, a three-dimensional cube may be presented as a security challenge to a user. In response, using any number of the embodiments described above, the user may move the cube in certain ways, rotate the cube in certain ways, zoom-into or zoom-away from the cube, move about the cube, teleport the cube to certain locations and the like. If the user performs the manipulations in the correct sequence and/or with a given amount of time, the program, computer system, may be unlocked.

In various embodiments, if the user does not perform the manipulations to a sufficient quality level, the user is prevented from using the program, using the computer system, or the like. In other embodiments, if manipulations are not of sufficient quality, the user need not be locked-out, but may be directed to alternative programs or be given limited access to the computer system, or the like. In still other embodiments, if the manipulations are not of sufficient quality, the user's actions with the program/computer system may be logged for security purposes.

In still other embodiments of the present invention, other types of data may be determined from sensing surface 30 and used by computer system 90. For example, the amount of pressure applied by the user's fingers may be determined; the path traced by the user's fingers may be recognized to indicate a particular command, menu, or the like; the velocity of the user's finger movements may be used; or the like.

In other embodiments of the present invention, instead of or in combination with a user contacting sensing surface 30 with their fingers, the user may use any other device to contact sensing surface 30. As an example, the user may use a stylus a laser, or the like to contact sensing surface 30. In another example, the user may be given any number of specialized "pucks" that may be contacted with sensing surface. In such embodiments, each puck may have a distinct shape that is recognized by computer system 90 and associated with a specialized command, menu structure, or the like. For example, the user may place a puck on sensing surface 30 that includes a distinctive shape, that includes a distinctive optical bar code, infrared signature (active or passive), or the like. In response, the computer system may display a list of commands from which the user may select. In various embodiments, the user may also shape their hands into special positions and place them on sensing surface. In such examples, when computer system 90 recognizes a shape, e.g. "c" shape, "o" shape, or the like, specific commands or menus associated with the shape are retrieved and/or performed.

Other embodiments may be applied to resize windows on sensing surface 20. For example, in some embodiments, the user may contact a first of a first hand and second finger of a second hand upon sensing surface 20. In such cases, the first and second finger contact positions may be associated with diagonal corners of a window, for example. Thus, as the user moves their fingers as they are contacting sensing surface 20, the size of the window may be changed.

In other embodiments, the user may contact two fingers of one hand upon sensing surface 20 (e.g. thumb and pointer finger). In such examples, the user may then move these fingers apart quickly and the fingers may lose contact with sensing surface 20. In response, based upon the quickness of movement, the size of the window on sensing surface 20 may extend beyond the reach of both of the fingers. For example, a twenty inch diagonal window may be sized based upon the user moving their thumb and pointer finger apart quickly upon sensing surface 20; and a eight inch diagonal window may be sized based upon the user moving their thumb and pointer finger apart slowly. In still other embodiments, two windows may be resized at the same time, one based upon the right and one based upon the left hand at the same time. In various embodiments, if the windows are moved to be adjacent upon sensing surface 20, the window sizes may then be automatically resized to be similar.

In various embodiments of the present invention was illustrated with sensing surface 30. It should be clear that embodiments of the present invention may be used with any other type of display surface and computer system display 10 need not be planar. As examples, computer system display 10 may include any shaped display surface such as a spherical surface, a cylindrical surface, or the like. Accordingly, computer system display 10 and/or sensing surface 90 should be interpreted as referring generally to any display surface, either reflective, emissive, transmissive, or the like.

It should be understood that "rendering" may refer to a high quality process of converting an image from a mathematical description of a scene using a program such as Pixar's RenderMan®. Additionally, "rendering" may refer to any graphical visualization of the mathematical description of the scene, or any conversion of geometry to pixels, for example "rendering" with a lower quality rendering engine, or the like, such as GL and GPU hardware and software renderers, and the like. In some embodiments of the present invention, this type of real-time rendering may be used for entertainment programs, such as computer of console gaming, PC gaming, or the like.

In other embodiments, bio-metric inputs such as hand movements and the like could be used passwords and/or for user profile activation. In one embodiment, characteristic hand movements could be static such as three fingers in a specific area allow access. In other embodiments, combinations of characteristic hand movements, hand positions, static or temporal, could be used to activate a user profile, allow user access to the system, etc. For example, three fingers and a hand twist could be used, or three taps within a given time, or combinations thereof. In some embodiments, for security, If the user enters the wrong motion they could be denied entry to use the screen, or only denied access to certain programs, files, etc. Alternatively, the wrong hand movement may put the user at a different user interface to track what they are looking for. In this embodiment, the user may think they have gained access but in fact they are being monitored, and or allowed to believe they have access until security arrives.

In other embodiment, such entry hand or performance movements could be used to login someone in to a specific user profile, or different movements for different setups. For example, three fingers may be used for profile one, four fingers for profile two. In another embodiment, three fingers may be used for profile one. However, once profile one is displayed, another recognized user-movement could be used for accessing a sub profile.

Further embodiments can be envisioned to one of ordinary skill in the art after reading the attached documents. In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprising:
    determining a first set of virtual camera parameters for a virtual camera in three-dimensional space relative to a three-dimensional scene, wherein the location of the camera is within the three-dimensional scene, wherein the three-dimensional scene comprises at least one three-dimensional object, and wherein the first set of virtual camera parameters include a first three-dimensional position of the virtual camera;
    determining a first image of the three-dimensional scene in response to the first set of virtual camera parameters in three-dimensional space;
    displaying the first image of the three-dimensional scene to the user on a user interface display of the computer system;
    determining a first position of a first indicator of a user placed upon the first image on the user interface display of the computer system;
    determining a first position of a second indicator of the user placed upon the first image on the user interface display of the computer system;
    determining a second position of the first indicator of the user placed upon the user interface display of the computer system;
    determining a second position of the second indicator of the user placed upon the user interface display of the computer system;
    determining a second set of virtual camera parameters for the virtual camera in three-dimensional space relative to the three-dimensional scene in response to the first set of virtual camera parameters, to the first position and the second positions of the first indicator of the user, and to the first position and the second position of the second indicator, wherein the second set of virtual camera parameters include a second three-dimensional position of the virtual camera,
    wherein when the second position of the first indicator is shifted in a vertical direction upon the user interface display from the first position of the first indicator concurrently with the second position of the second indicator being shifted in the vertical direction upon the user interface display from the first position of the second indicator, the virtual camera is moved forward parallel to a ground plane from the first three-dimensional position to the second three-dimensional position in the three-dimensional scene;
    determining an updated three-dimensional scene based on the second three-dimensional position of the virtual camera;
    determining a second image of the updated three-dimensional scene in response to the second set of virtual camera parameters in three-dimensional space; and
    displaying the second image of the three-dimensional scene to the user on the user interface display of the computer system.

2. The method of claim 1 wherein determining the second set of virtual camera parameters in three-dimensional space comprises:
    determining a first direction of movement between the first position and the second position of the first finger of the user;
    determining a second direction of movement between the first position and the second position of the second finger of the user; and
    determining the second set of virtual camera parameters is in response to the first direction, the second direction, and the first set of virtual camera parameters.

3. The method of claim 2 wherein determining the second set of virtual camera parameters comprises:
    determining a relative direction between the first direction and the second direction; and
    modifying the first set of virtual camera parameters to become the second set of virtual camera parameters in response to the relative direction, the first direction, and the second direction.

4. The method of claim 3 wherein when the relative direction is upwards or downwards, a virtual camera roll parameter is modified.

5. The method of claim 1 wherein the first indicator is selected from a group consisting of: a finger of the user, a stylus, a pointing device, a laser spot.

6. The method of claim 1, wherein when the second position of the first indicator is shifted in a downward direction upon the user interface device from the first position of the first indicator, and the second position of the second indicator is shifted in the downward direction upon the user interface device from the first position of the second indicator, the virtual camera is moved backward along the plane parallel to a ground plane of the three-dimensional scene.

7. A computer program product comprising a non-transitory tangible medium including computer system executable code for a computer system including a processor, a memory and a user interface display, the computer program product comprising:
  code that directs the processor to determine a first set of virtual camera parameters for a virtual camera in three-dimensional space relative to a three-dimensional scene, wherein the location of the camera is within the three-dimensional scene, wherein the three-dimensional scene comprises at least one three-dimensional object, and wherein the first set of virtual camera parameters include a first three-dimensional position of the virtual camera;
  code that directs the processor to determine a first image of the three-dimensional scene in response to the first set of virtual camera parameters in three-dimensional space;
  code that directs the processor to display the first image of the three-dimensional scene to the user on user interface display of the computer system;
  code that directs the processor to determine a first position of a first indicator of a user placed upon the first image on the user interface display of the computer system;
  code that directs the processor to determine a first position of a second indicator of the user placed upon the first image on the user interface display of the computer system;
  code that directs the processor to determine a second position of the first indicator of the user placed upon the user interface display of the computer system;
  code that directs the processor to determine a second position of the second indicator of the user placed upon the user interface display of the computer system;
  code that directs the processor to determine a second set of virtual camera parameters for the virtual camera in three-dimensional space relative to the three-dimensional scene in response to the first set of virtual camera parameters, to the first position and the second positions of the first indicator of the user, and to the first position and the second position of the second indicator, wherein the second set of virtual camera parameters include a second three-dimensional position of the virtual camera, wherein when the second position of the first indicator is shifted in a vertical direction upon the user interface display from the first position of the first indicator concurrently with the second position of the second indicator being shifted in the vertical direction upon the user interface display from the first position of the second indicator, the virtual camera is moved forward parallel to a ground plane from the first three-dimensional position to the second three-dimensional position in the three-dimensional scene;
  code that directs the processor to determine an updated three-dimensional scene based on the second three-dimensional position of the virtual camera;
  code that directs the processor to determining a second image of the updated three-dimensional scene in response to the second set of virtual camera parameters in three-dimensional space; and
  code that directs the processor to display the second image of the three-dimensional scene to the user on the user interface display of the computer system.

8. The computer program product of claim 7 further comprising:
  code that directs the processor to determine a first direction of movement between the first position and the second position of the first finger of the user;
  code that directs the processor to determine a second direction of movement between the first position and the second position of the second finger of the user; and
  code that directs the processor to determine the second set of virtual camera parameters is in response to the first direction, the second direction, and the first set of virtual camera parameters.

9. The computer program product of claim 7 further comprising:
  code that directs the processor to determine a relative direction between the first direction and the second direction; and
  code that directs the processor to modify the first set of virtual camera parameters to become the second set of virtual camera parameters in response to the relative direction, the first direction, and the second direction.

10. The computer program product of claim 9 wherein when the relative direction is upwards or downwards, a virtual camera roll parameter is modified.

11. A computer system comprising:
  a memory configured to store a first set of virtual camera parameters for a virtual camera in three-dimensional space relative to a three-dimensional scene, wherein the location of the camera is within the three-dimensional scene, wherein the three-dimensional scene comprises at least one three-dimensional object, and wherein the first set of virtual camera parameters include a first three-dimensional position of the virtual camera;
  a processor coupled to the memory, wherein the processor is configured to:
    determine a first image of the three-dimensional scene in response to the first set of virtual camera parameters in three-dimensional space,
    determine a first position of a first indicator of a user placed upon the first image on a user interface display of the computer system,
    determine a first position of a second indicator of the user placed upon the first image on the user interface display of the computer system,
    determine a second position of the first indicator of a user placed upon the user interface display of the computer system,
    determine a second position of the second indicator of the user placed upon the user interface display of the computer system,
    determine a second set of virtual camera parameters for the virtual camera in three-dimensional space relative to the three-dimensional scene in response to the first set of virtual camera parameters, to the first position and the second position of the first indicator of the user, and to the first position and the second position of the second indicator, wherein the second set of virtual camera parameters include a second three-dimensional position of the virtual camera, wherein when the second position of the first indicator is shifted in a vertical direction upon the user interface display from the first position of the first indicator concurrently with the second position of the second indicator being shifted in the vertical direction upon the user interface display from the first position of the second indicator, the virtual camera is moved forward parallel to a ground plane from the first three-dimensional position to the second three-dimensional position in the three-dimensional scene, determine an updated three-dimensional scene based on the second three-dimensional position of the virtual camera, and determine a second image of the updated three-dimensional scene in response to the second set of virtual camera parameters in three-dimensional space; and the user interface display coupled to the processor, wherein the user interface display is configured to display the first image of the three-dimensional scene to the user on the user interface display, and configured to display the second image of the three-dimensional scene to the user on the user interface display.

12. The computer system of claim 11 wherein the first indicator is selected from a group consisting of: a finger of the user, a stylus, a pointing device, a laser spot.

13. A method for a computer system comprises displaying a representation of a plurality of three-dimensional objects, wherein a first three-dimensional object is located at a first three-dimensional location at a first display position on a display to a user;

determining a first user interface position of a first indicator of a user placed upon a user interface device of the computer system;

determining a selection of the first three-dimensional object of the plurality of three-dimensional objects in response to the first user interface position of the first indicator being at the first display position;

displaying a representation of a plurality of geometric constraints associated with the first three-dimensional object at a plurality of display positions on the display to the user;

while the first indicator of the user is placed upon the user interface device, determining a second user interface position of a second indicator of the user placed upon the user interface device;

determining a selection of a geometric constraint from the plurality of geometric constraints in response to the second user interface position and the plurality of display positions;

determining movement of the second indicator of the user placed upon the user interface device from the second user interface position to a third user interface position;

moving the first three-dimensional object from the first three-dimensional location to a second three-dimensional location along the direction of the selected geometric constraint, in response to the movement of the second indicator and in response to the selected geometric constraint;

determining a representation of the first three-dimensional object located at the second three-dimensional location; and displaying the representation of the first three-dimensional object located at the second three-dimensional location at a second display position on the display to the user.

14. The method of claim 13 wherein the geometric constraint from the plurality of geometric constraints is selected from the group consisting of: a translational movement constraint along a geometric axis within three-dimensional space, a rotational constraint along a geometric axis within three-dimensional space.

15. The method of claim 14 wherein prior to determining movement of the second indicator of the user, the method comprises determining that the second indicator of the user is removed from the user interface device of the computer system.

16. The method of claim 13 wherein while the first indicator of the user is placed upon the user interface device, determining a fourth user interface position of a third indicator of the user placed upon the user interface device;

wherein determining the selection of the geometric constraint from the plurality of geometric constraints is also in response to the fourth user interface position.

17. The method of claim 16 wherein the geometric constraint from the plurality of geometric constraints comprises a translational movement constraint within a geometric plane within three-dimensional space.

18. The method of claim 13 wherein prior to determining movement of the second indicator of the user, the method comprises determining that the second indicator of the user is removed from the user interface device of the computer system.

19. The method of claim 13 wherein the first indicator is selected from a group consisting of: a finger of the user, a stylus, a pointing device, a laser spot.

20. The method of claim 13 wherein differences in geometric placement of the first three-dimensional object are constrained between the first three-dimensional location and the second three-dimensional location.

21. The method of claim 20 wherein the first three-dimensional location and the second three-dimensional location have a similar ground plane.

22. The method of claim 13 wherein determining the second user interface position of a second indicator of the user placed upon the user interface device occurs while the first indicator of the user is placed upon the user interface device.

23. The method of claim 13 wherein moving the first three-dimensional object from the first three-dimensional location to a second three-dimensional location, in response to the second user interface position occurs before the first indicator of the user is removed from the user interface device.

24. The method of claim 13 wherein determining the second user interface position of a second indicator of the user placed upon the user interface device occurs after the first indicator of the user is removed from the user interface device.

25. The method of claim 13 wherein moving the first three-dimensional object from the first three-dimensional location to a second three-dimensional location, in response to the second user interface position occurs after the first indicator of the user is removed from the user interface device.

26. A computer program product comprising a non-transitory tangible medium including computer system executable code for a computer system including a processor, a memory and a display, the computer program product comprising:

code that directs the processor to display a representation of a plurality of three-dimensional objects, wherein a first three-dimensional object is located at a first three-dimensional location at a first display position on the display to a user;

code that directs the processor to determine a first user interface position of a first indicator of the user placed upon a user interface device of the computer system;

code that directs the processor to determine a selection of the first three-dimensional object of the plurality of three-dimensional objects in response to the first user interface of the first indicator being at the first display position;

code that directs the processor to display a representation of a plurality of geometric constraints associated with the first three-dimensional object at a plurality of display positions on the display to the user;

code that directs the processor to determine a second user interface position of a second indicator of the user placed upon the user interface device, while the first indicator of the user is placed upon the user interface device;

code that directs the processor to determine a selection of a geometric constraint from the plurality of geometric constraints in response to the second user interface position and the plurality of display positions;

code that directs the processor to determine movement of the second indicator of the user placed upon the user interface device from the second user interface position to a third user interface position;

code that directs the processor to move the first three-dimensional object from the first three-dimensional location to a second three-dimensional location along the direction of the selected geometric constraint, in response to the movement of the second indicator and in response to the selected geometric constraint;

code that directs the processor to determine a representation of a first three-dimensional object located at the second three-dimensional location; and code that directs the processor to display the representation of the first three-dimensional object located at the second three-dimensional location at a second display position on the display to the user.

27. The computer program product of claim 26 wherein the geometric constraint from the plurality of geometric constraints is selected from the group consisting of: a translational movement constraint along a geometric axis within three-dimensional space, a rotational constraint along a geometric axis within three-dimensional space.

28. The computer program product of claim 27 further comprising code that directs the processor to determine that the second indicator of the user is removed from the user interface device of the computer system.

29. The computer program product of claim 26 further comprising:

code that directs the processor to determine a fourth user interface position of a third indicator of the user placed upon the user interface device, while the first indicator of the user is placed upon the user interface device; and code that directs the processor to determine the selection of the geometric constraint from the plurality of geometric constraints in response to the fourth user interface position.

30. The computer program product of claim 29 wherein the geometric constraint from the plurality of geometric constraints comprises a translational movement constraint within a geometric plane within three-dimensional space.

31. The computer program product of claim 26 further comprising code that directs the processor to determine that the second indicator of the user is removed from the user interface device of the computer system.

32. A computer system comprising:

a memory configured to store a model of a first three-dimensional object;

a processor coupled to the memory, wherein the processor is configured to:

determine a representation of a plurality of three-dimensional objects, wherein the first three-dimensional object is located at a first three-dimensional location in response to the model, determine a first user interface position of a first indicator of a user placed upon a user interface device of the computer system, determine a selection of the first three-dimensional object of the plurality of three-dimensional objects in response to the first user interface position of the first indicator being at a first display position, determine a second user interface position of a second indicator of the user placed upon the user interface device, while the first indicator of the user is placed upon the user interface device, determine a selection of a geometric constraint from the plurality of geometric constraints in response to the second user interface position, configured to determine movement of the second indicator of the user placed upon the user interface device from the second user interface position to a third user interface position, move the first three-dimensional object from the first three-dimensional location to a second three-dimensional location along the direction of the selected geometric constraint, in response to the movement of the second indicator and in response to the selected geometric constraint, and determine a representation of a first three-dimensional object located at the second three-dimensional location; and a display coupled to the processor, wherein the display is configured to:

display the representation of the first three-dimensional object located at the second three-dimensional location at a second display position on the display to the user, display the representation of the first three-dimensional object located at the first three-dimensional location at the first display position on the display to the user, and display a representation of a plurality of geometric constraints associated with the first three-dimensional object at a plurality of display positions on the display to the user.

* * * * *